(12) United States Patent
Osaka et al.

(10) Patent No.: US 10,259,121 B2
(45) Date of Patent: Apr. 16, 2019

(54) ROBOT APPARATUS, AND MEASURING METHOD OF ROTATION DRIVING APPARATUS

(71) Applicant: CANON KABUSHIKI KAISHA, Tokyo (JP)

(72) Inventors: Tsutomu Osaka, Yokohama (JP); Takahiro Ishikawa, Kawasaki (JP); Shunsuke Kawamura, Toride (JP); Yohei Kawaguchi, Moriyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 231 days.

(21) Appl. No.: 15/200,385

(22) Filed: Jul. 1, 2016

(65) Prior Publication Data
US 2017/0015004 A1   Jan. 19, 2017

(30) Foreign Application Priority Data
Jul. 14, 2015 (JP) .................. 2015-140622

(51) Int. Cl.
*B25J 13/08* (2006.01)
*B25J 19/00* (2006.01)
*B25J 9/16* (2006.01)

(52) U.S. Cl.
CPC ........... *B25J 13/088* (2013.01); *B25J 9/1641* (2013.01); *B25J 9/1674* (2013.01); *B25J 13/089* (2013.01); *B25J 19/0095* (2013.01); *G05B 2219/37209* (2013.01); *G05B 2219/41059* (2013.01)

(58) Field of Classification Search
CPC .... B25J 13/088; B25J 13/089; B25J 19/0095; B25J 9/1641; B25J 9/1674; G05B 2219/37209; G05B 2219/41059
See application file for complete search history.

(56) References Cited

U.S. PATENT DOCUMENTS

| | | | |
|---|---|---|---|
| 5,101,146 A * | 3/1992 | Teshima | G05B 19/404 318/561 |
| 6,664,752 B2 * | 12/2003 | Kanayama | G05B 19/311 318/560 |
| 6,701,212 B2 | 3/2004 | Shiba | |
| 9,342,067 B2 | 5/2016 | Osaka | |
| 9,348,331 B2 | 5/2016 | Ishikawa | |
| 2001/0005800 A1 * | 6/2001 | Shiba | G05B 19/404 700/193 |
| 2012/0245711 A1 * | 9/2012 | Park | F16M 11/12 700/13 |
| 2014/0084840 A1 * | 3/2014 | Osaka | G05B 19/404 318/632 |
| 2015/0151432 A1 * | 6/2015 | Gomi | B25J 9/1641 700/258 |
| 2015/0165620 A1 | 6/2015 | Osaka | |
| 2015/0248116 A1 | 9/2015 | Kawaguchi | |

FOREIGN PATENT DOCUMENTS

JP   3089915     7/2000
JP   2001-166805  6/2001

* cited by examiner

*Primary Examiner* — Rachid Bendidi
(74) *Attorney, Agent, or Firm* — Venable LLP

(57) ABSTRACT

The present invention enables to easily and accurately measure a joint of a robot apparatus, in particular, a lost motion of a driving system of the joint, and, to easily and accurately perform a diagnosis of a lifetime or a life expectancy of a joint mechanism of the robot apparatus based on a measured result.

17 Claims, 12 Drawing Sheets

ROBOT APPARATUS, AND MEASURING METHOD OF ROTATION DRIVING APPARATUS

BACKGROUND OF THE INVENTION

Field of the Invention

The present invention relates to a robot apparatus, and a measuring method of a rotation driving apparatus.

Description of the Related Art

Conventionally, various robot apparatuses have been used in production sites of workpieces such as industrial products and the like. Recently, a robot apparatus or a robot system which is equipped with a multi-shaft multi-joint robot arm capable of performing more complicated operations is spreading. For example, a production line in which workpieces such as industrial products and the like are manufactured by using a so-called robot cell constituted by combining a plurality of robot apparatuses is known.

The constitution of the robot arm of the robot apparatus like this to be used for industrial purposes is sometimes classified into a vertical multi-joint constitution, a horizontal multi-joint constitution and the like, in accordance with the structure consisting of links and joints thereof. However, in any arm constitution, the basic constructions of the joints are similar to others. More specifically, the constitution of transmitting the output of a rotation driving source to the rotation shaft (or axis) of the driven-side link via a transmission (a speed reducer in many cases) is used.

Particularly, in the production line of the robot cell constitution, when the lifetime of one of the robot apparatuses included in the production line has come, it is necessary to suspend the manufacturing process and immediately take measures such as exchange of the relevant robot apparatus or the like. In general, it should be noted that the lifetime of the robot arm depends on the lifetime of the transmission (the speed reducer in many cases) used in the joint of the robot arm.

For this reason, in the workpiece (article) production system for which the robot apparatus is used, means for accurately diagnosing the lifetime of the transmission (speed reducer) of the robot arm has been desired. More specifically, if it is possible to estimate life expectancy of the transmission, then it is conceivable to be able to incorporate preventive measures such as assembly exchange of the joint, exchange for a new robot arm or an overhauled robot arm, and the like, into a production schedule. Thus, it is possible to prevent that the production line is suspended or stopped due to a sudden breakdown (coming of lifetime) of the robot arm.

In consideration of such situations as above, various techniques related to such lifetime diagnosis of the robot arm have been proposed recently. More specifically, the technique of measuring a wear amount of the gear of each joint, and then deciding the lifetime of the robot arm by converting the measured wear amount into a looseness amount at the arm end position has been proposed (for example, Japanese Patent No. 3089915). Besides, the technique of detecting and correcting a lost motion of the rotation driving system (due to looseness and/or hysteresis of the driving unit) by using the machine-end encoder and the motor encoder has been proposed (for example, Japanese Patent Application Laid-Open No. 2001-166805).

However, in case of measuring the wear amount of the gear by the technique described in Japanese Patent No. 3089915, it is necessary to once stop the robot arm and then measure the wear amount of the gear from the outside of the robot arm, and thus a manufacture interruption period due to time necessary for the measurement tends to be prolonged. Moreover, it may be necessary to take the robot arm apart in some cases. At that time, there is a problem that more operation time becomes necessary.

Moreover, Japanese Patent Application Laid-Open No. 2001-166805 discloses the constitution of measuring the lost motion by using the output-end encoder (machine-end encoder) and the input-end encoder (motor encoder) of the driving system such as a rack and pinion. Basically, it is conceivable that a similar measuring method can be applied to a rotation driving system of the joint of a vertical multi-joint (multi-shaft) robot arm. However, in a multi-shaft multi-joint robot arm, there is a possibility that a dynamic (mechanical) condition related to a measurement-target joint (the rotation driving system thereof) variously changes according to, for example, the orientation (position) of the arm, and such a change influences a measurement result. For this reason, it is difficult only by simply carrying out the measuring system described in Japanese Patent Application Laid-Open No. 2001-166805 to achieve high-reliability and high-accuracy lost motion measurement.

SUMMARY OF THE INVENTION

The present invention aims to be able to easily and accurately measure the joint of a robot apparatus, particularly, a lost motion of the driving system thereof, and, to easily and accurately diagnose a lifetime or life expectancy of the joint mechanism of the robot apparatus based on a measurement result.

In order to achieve such an object as above, the present invention is characterized by a robot apparatus which drives a driven part by driving a joint with a controlling apparatus, wherein: the joint comprises, a rotation driving source, a transmission, having an input-side rotation shaft and an output-side rotation shaft, configured to make the number of rotations of the output-side rotation shaft smaller than the number of rotations of the input-side rotation shaft rotated by the rotation driving source, a first angle sensor configured to measure a rotation angle of the input-side rotation shaft, and a second angle sensor configured to measure a rotation angle of the output-side rotation shaft; and the controlling apparatus comprises an obtaining unit configured to obtain output values of the first and second angle sensors by rotating the rotation driving source, in order to obtain a magnitude of a lost motion of the transmission.

According to the present invention, it is possible to measure the value of the lost motion of the transmission based on the output values of the first and second angle sensors respectively measuring the rotation angles of the input-side and output-side rotation shafts of the transmission provided in the driving system of the joint of the robot apparatus. Moreover, it is possible to easily and accurately diagnose the lifetime or the life expectancy of the joint mechanism of the robot apparatus, based on the value of the lost motion measured.

Further features of the present invention will become apparent from the following description of exemplary embodiments with reference to the attached drawings.

DESCRIPTION OF THE EMBODIMENTS

Figure 1:
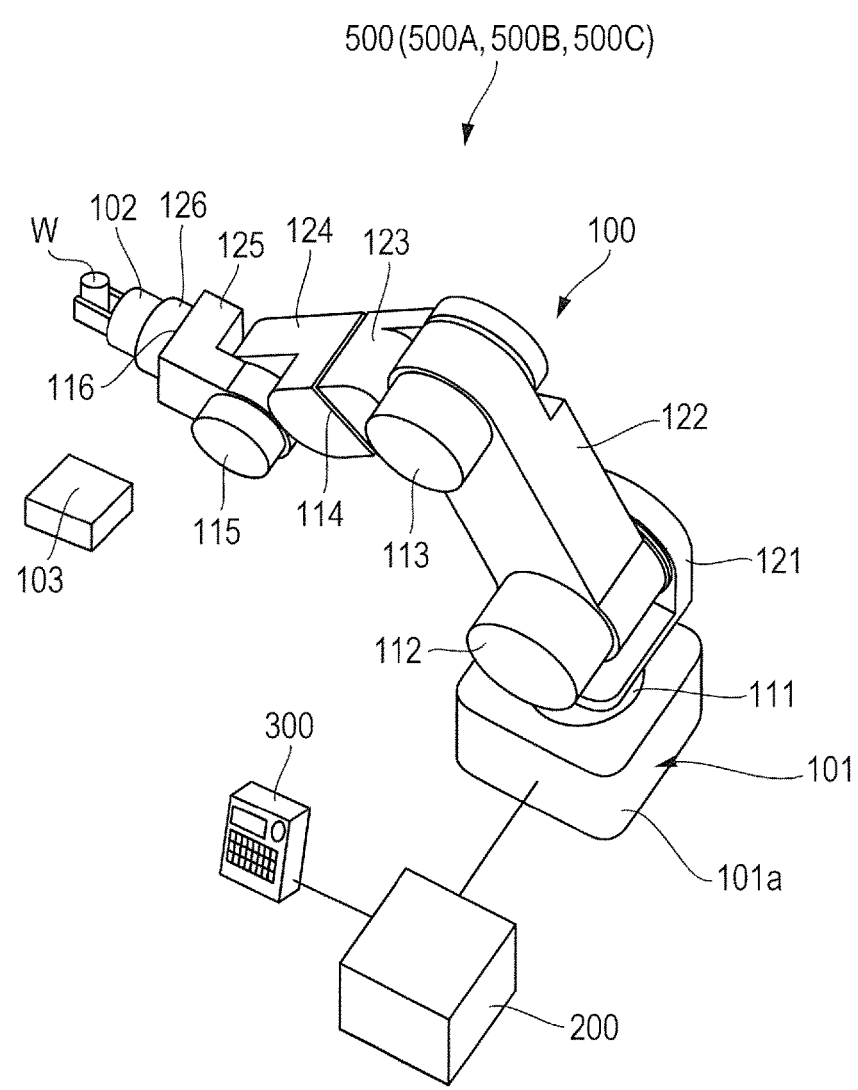
FIG. 1 is a perspective diagram for schematically illustrating a robot apparatus according to the first embodiment of the present invention.

Hereinafter, preferred embodiments of the present invention will be described in detail with reference to the attached drawings. It should be noted that the following embodiments are merely examples, and it is thus possible for a person skilled in the art to properly change and modify, for example, the detailed constitutions and configurations of the embodiments without departing from the split and scope of the present invention. In addition, it should be noted that the numerical numbers and values used in the embodiments are merely referential numbers and values, and thus these numbers and values do not limit the present invention.

A robot apparatus related to each of the following embodiments includes a robot apparatus which performs assembling and processing in, for example, a workpiece (industrial product) manufacturing site. The robot apparatus like this has a robot arm such as a multi-joint arm, and the joint of the relevant arm includes a rotation driving source (for example, a motor) and a transmission (for example, a speed reducer). Moreover, in the robot apparatus according to each of the following embodiments, a lost motion of the transmission (speed reducer) of the joint is measured, and lifetime diagnosis and life expectancy estimation are performed for the joint, particularly the transmission (speed reducer), based on the obtained measurement value.

A gear mechanism is used for each of many kinds of speed reducers used as the transmission of the joint of the robot arm of this kind. In the speed reducer which uses general gears, when operation (running) time becomes long, the lost motion (backlash and/or looseness) increases because the used gear is worn.

In the speed reducer provided in the joint of the robot apparatus, for example, a wave gearing mechanism of which the number of parts is small, which is compact and lightweight, and by which a large reduction ratio can be given is often used. In the wave gearing mechanism, looseness such as a backlash can be suppressed comparatively small because an elastic gear is often used. However, there is a hysteresis characteristic in position (angle) control between input and output shafts, and such hysteresis can be considered as a type of looseness. According to the robot apparatus described in this application, it is possible to detect the lost motion also including the hysteresis like this.

Particularly, in the transmission (speed reducer) using the gear mechanism, since the shape of the gear deforms due to wear thereof in proportion to operation time, there is a possibility that a predetermined interlocking state cannot be obtained. Besides, the lost motion of the transmission (speed reducer) highly influences accuracy of, for example, control of the position (angle) or the orientation of the joint of the robot arm. Therefore, if the lost motion of the transmission (speed reducer) of the joint of the robot arm can be measured, it is possible to predict the lifetime or the life expectancy of the relevant joint (particularly, the transmission thereof) by comparing the measured lost motion value with a predetermined lost motion allowable range (tolerance).

In general, "lifetime" of a machine part means a length of time from an installation initial state to a state that the part becomes unsuitable for use, or a state (so-called a fault state) that the part is unstable for use. In the transmission, for example, when the lost motion increases, since arm-end accuracy, meshes of gears and the like deteriorate, performance of the transmission deteriorates, and thus the lifetime (the length thereof) is determined. Incidentally, the lifetime from the present time (the lifetime estimated or predicted at the present time) may be called "life expectancy".

In the following embodiments, by using a rotary encoder (angle sensor: simply called "encoder" hereinafter) arranged in a joint of the robot arm, the lost motion of the transmission (speed reducer in many cases) of the relevant joint is measured. Then, it is possible based on the measured lost motion to diagnose the lifetime of the relevant transmission. For example, the lifetime is diagnosed according to whether or not the measured lost motion is within a predetermined allowable range (corresponding to a normal usable state).

Hereinafter, the robot apparatus according to the first to fifth embodiments will be described concretely.

First Embodiment

Figure 2:
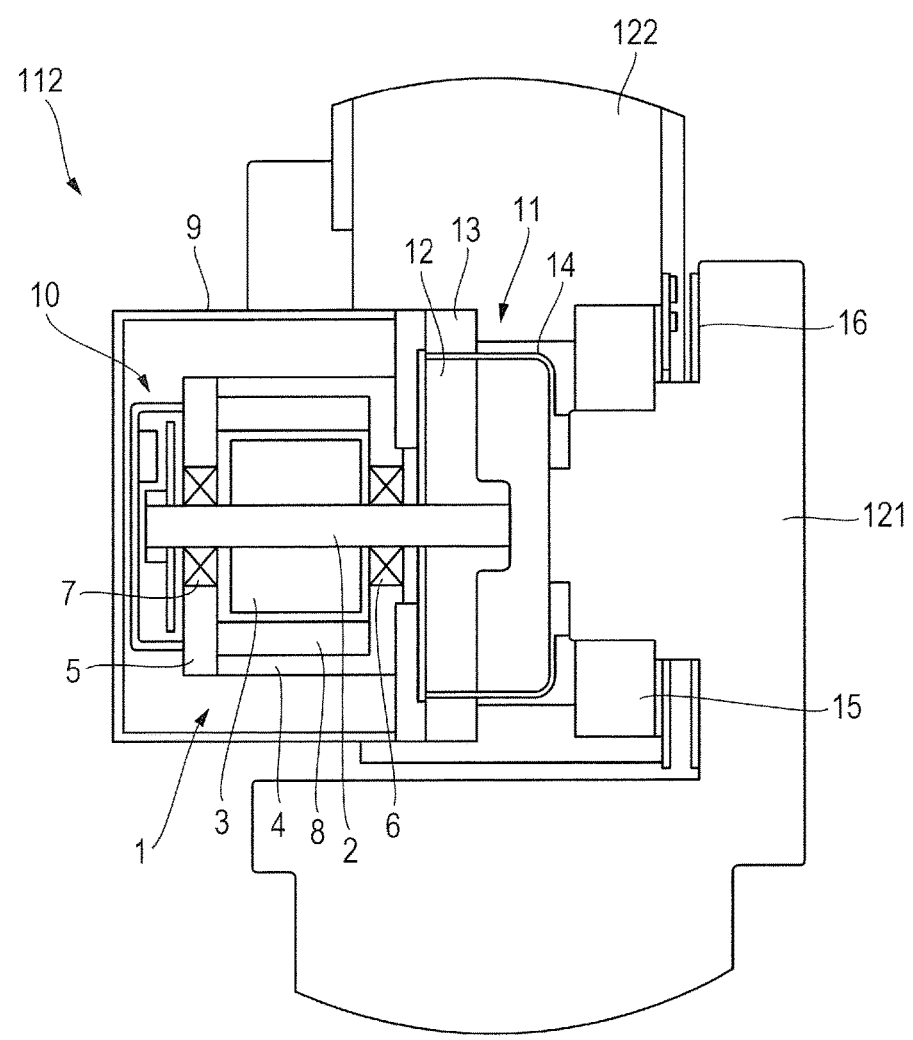
FIG. 2 is a cross-section diagram for illustrating the constitution of the joint of the robot arm illustrated in FIG. 1.
Figure 3:
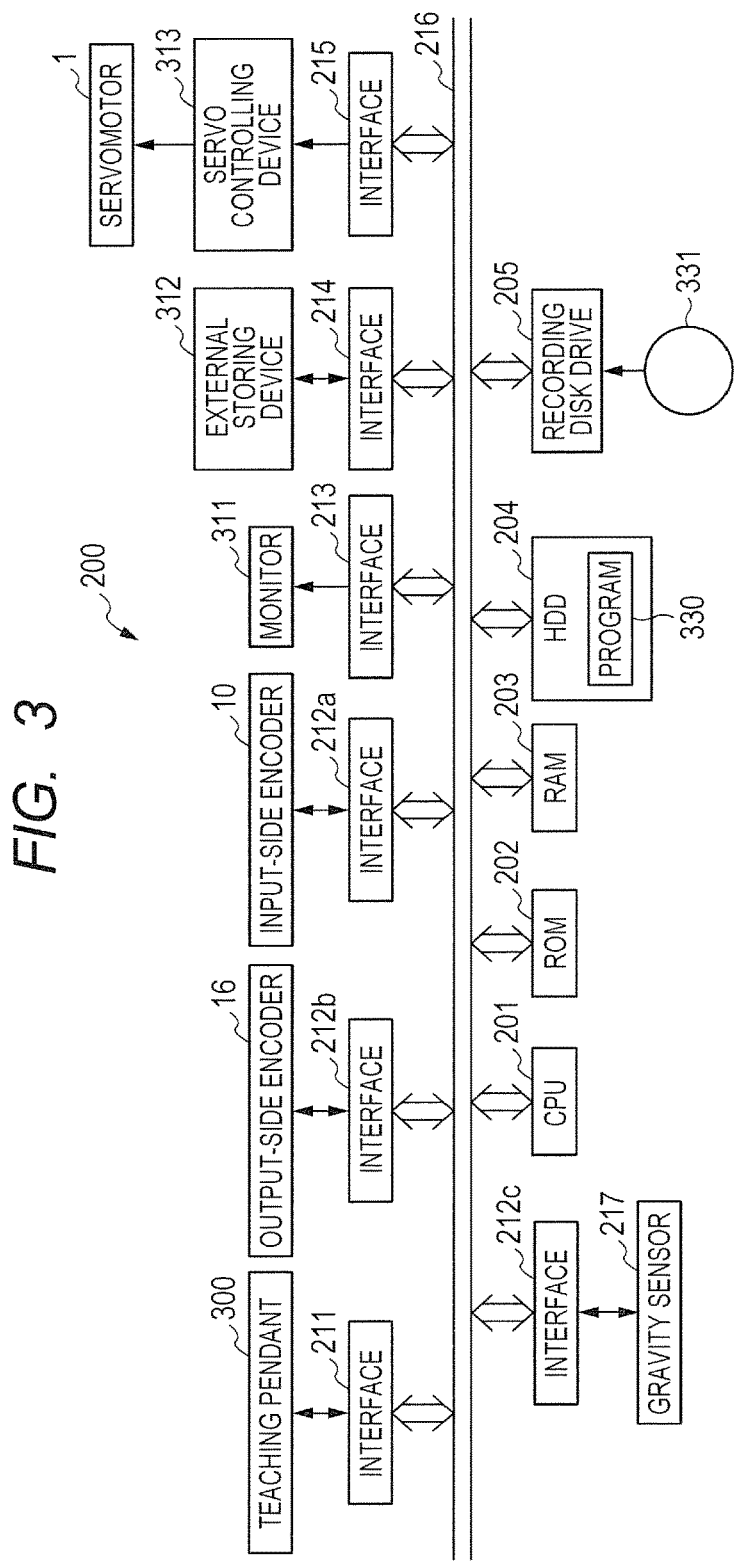
FIG. 3 is a block diagram for illustrating the constitution of the controlling apparatus of the robot apparatus according to the first embodiment.

A robot apparatus 500 according to the first embodiment of the present invention will be described with reference to FIGS. 1 to 8. First, the entire constitution of the robot apparatus 500 according to the first embodiment will be described with reference to FIGS. 1 to 3. Namely, FIG. 1 is the perspective diagram for schematically illustrating the robot apparatus 500 according to the first embodiment, FIG. 2 is the cross-section diagram for illustrating one cross-section constitution of the joint of a robot arm 100 illustrated in FIG. 1, and FIG. 3 is the block diagram for illustrating the constitution of a controlling apparatus 200 of the robot apparatus 500 according to the present embodiment.

As illustrated in FIG. 1, the robot apparatus 500 comprises the robot arm 100 which performs assembly with a work W, the controlling apparatus 200 which controls the robot arm 100, and a teaching pendant 300 which serves as an operation terminal.

The robot arm 100 comprises, for example, a six-shaft multi-joint robot arm 101, a hand (end effector) 102 which is connected to the end of the robot arm 101, and a not-illustrated force sensor which can detect the force or the like acting on the hand 102. The robot arm 101, which is installed on base 101*a* fixed to a not-illustrated worktable, comprises a plurality of links 121 to 126 which transmit displacements and force, and a plurality of joints 111 to 116 which respectively connect the links 121 to 126 evolutionally or rotationally.

Here, since the respective basic constitutions of the plurality of joints 111 to 116 are the same, only the joint 112 provided between the links 121 and 122 will be described in the present embodiment. Thus, the descriptions of the remaining joints 111 and 113 to 116 are omitted. It should be noted that measurement control described below can be achieved if a joint having the constitution same as that of the joint 112 (FIG. 2) is provided for at least one of the plurality of joints 111 to 116 of the robot arm 101.

The joint 112 of the robot arm 101 has the cross-section constitution as illustrated in FIG. 2. In FIG. 2, the joint 112 comprises a servomotor (motor) 1, an input-side encoder (first angle sensor) 10 which detects the rotation angle (input-side rotation angle) of the servomotor 1, and a speed reducer 11 which reduces (decelerates) the output of the servomotor 1. Moreover, an output-side encoder 16 which detects the rotation angle (output-side rotation angle) of the driving shaft (speed reducer output shaft) of the link 122 is provided on the output side of the speed reducer 11.

The servomotor 1, which serves as the rotation driving source, is constituted by an electromagnetic motor such as a brushless DC (direct-current) motor, an AC (alternating-current) servomotor or the like. The servomotor 1 comprises a rotation unit 4 which is constituted by a rotation shaft 2 and a rotor magnet 3, a motor housing 5, bearings 6 and 7 which rotatably support the rotation shaft 2, and a stator coil 8 which rotates the rotation unit 4. The bearings 6 and 7 are supported by the motor housing 5, the stator coil 8 is attached to the motor housing 5, and the servomotor 1 is covered by a motor cover 9.

The input-side encoder (input-side angle detecting unit) 10, which is arranged at one end of the rotation shaft 2 of the servomotor 1, generates an input-side pulse signal according to the rotation of the rotation shaft 2 of the servomotor 1, and outputs the generated input-side pulse signal to the controlling apparatus 200. Incidentally, a brake unit for holding the orientation or the position of the robot arm 101 when the power supply is being OFF may be provided between the servomotor 1 and the input-side encoder 10, according to necessity.

The speed reducer 11 comprises a web generator 12 which serves as an input unit, a circular spline 13 which serves as an output unit, and a flex spline 14 which is arranged between the web generator 12 and the circular spline 13. The web generator 12 is connected to the other end on the side opposite to the side of the rotation shaft 2 of the servomotor 1 on which the input-side encoder 10 is arranged.

The flex spline 14 is fixed to the link 121, whereas the circular spline 13 is connected to the link (driven part) 122 to determine the rotation angle of the link 122. Namely, the connection portion between the rotation shaft 2 of the servomotor 1 and the web generator 12 corresponds to the input side of the speed reducer 11, and the connection portion between the flex spline 14 and the link 122 corresponds to the output side of the speed reducer 11. The number of rotations of the servomotor 1 is reduced to 1/N (reduction by a reduction ratio N) by means of the speed reducer 11, and the link 121 and the link 122 relatively rotate. The rotation angle on the output side of the speed reducer 11 at this time is the actual output angle, that is, the angle of the joint 112.

The output-side encoder (second angle sensor) 16, which is arranged on the output side of the speed reducer 11, detects the relative angles of the links 121 and 122. More specifically, the output-side encoder 16 generates an output-side pulse signal according to the driving of the joint 112 (i.e., the relative movements of the links 121 and 122), and outputs the generated output-side pulse signal to the controlling apparatus 200. Incidentally, it is possible to constitute each of the input-side encoder 10 and the output-side encoder 16 as an optical or magnetic rotary encoder, as well as a general rotary encoder. Besides, since a cross roller bearing 15 is provided between the links 121 and 122, the links 121 and 122 are rotatably connected to each other via the cross roller bearing 15.

Again, in FIG. 1, the hand 102 comprises a plurality of fingers capable of grasping the work W, and a not-illustrated actuator capable of driving the plurality of fingers. Thus, it is possible to cause the hand to grasp the work W by driving the plurality of fingers. The hand 102 comprises a not-illustrated force sensor. The force sensor is used to detect force acting on the hand 102 and moments, when the hand 102 grasps the work W by using the plurality of fingers.

The robot arm 101 is installed in a production site such as a factory or the like, and can be used to process and assemble workpieces such as various industrial products. In that case, the work W is one of the parts which is fixed or attached to a workpiece 103 assembled by the robot arm 101. By managing the lifetime of the robot arm 101, particularly the lifetimes of the joint and the speed reducer thereof, with use of the lost motion measuring method exemplified in the present or another embodiment, it is possible to accurately control the orientation of the robot arm 101. For this reason, in the workpiece production site, it is possible to process and assemble the workpieces (various industrial products) with high degree of accuracy and reliability by using the robot arm 101, and it is thus possible to produce workpieces of superior quality with high yield.

For example, the controlling apparatus 200 of the robot apparatus 500 illustrated in FIG. 1 can be constituted as illustrated in FIG. 3. Namely, the controlling apparatus 200 illustrated in FIG. 3 comprises a CPU (central processing unit: arithmetic operating unit) 201, a ROM (read only memory) 202, a RAM (random-access memory) 203, an HDD (hard disk drive: storing unit) 204, a recording disk drive 205, and various interfaces 211, 212*a*, 212*b*, 212*c*, 213, 214 and 215.

The ROM 202, the RAM 203, the HDD 204, the recording disk drive 205 and the interfaces 211 to 215 are mutually connected via a bus 216. A basic program such as the BIOS (Basic Input/Output System) or the like has been stored in the ROM 202. The RAM 203 is the storing device which temporarily stores therein arithmetic operation results of the CPU 201.

The HDD 204 is the storing unit which stores therein various data and the like obtained as the arithmetic operation results of the CPU 201. Also, the HDD records therein a program 330 for causing the CPU 201 to perform various arithmetic operation processes (for example, later-described speed reducer state monitoring process). The CPU 201 performs the various arithmetic operation processes based on, for example, the program 330 recorded (stored) in the HDD 204. The recording disk drive 205 can read out various data, programs and the like recorded on a recording disk 331.

The teaching pendant 300 which can be operated by a user is connected to the interface 211 as a robot operating device used for teaching and the like to the robot arm 101. For example, a user interface, which is constituted by a displaying device such as an LCD (liquid crystal display) panel or the like, a keyboard and the like, is arranged on the teaching pendant 300. The user interface of this type is used to designate an angle of each joint of the robot arm 101 by a jogging movement operation, or designate the position orientation (teaching point) of the reference point of the robot arm 101.

The teaching pendant 300 outputs a control amount according to the input operation via the user interface, for example, input target joint angles of the respective joints 111 to 116, to the CPU 201 via the interface 211 and the bus 216. The input-side encoder 10 and the output-side encoder 16 are respectively connected to the interface 212a and the interface 212b. The input-side encoder 10 and the output-side encoder 16 respectively output the above pulse signals to the CPU 201 via the interfaces 212a and 212b and the bus 216. Besides, a monitor 311 which displays various images is connected to the interface 213, and an external storing device 312 such as a rewritable non-volatile memory, an external HDD or the like is connected to the interface 214.

Besides, a servo controlling device 313 is connected to the interface 215. The CPU 201 can output driving instruction data indicating a control amount of the rotation angle of the rotation shaft 2 of the servomotor 1 to the servo controlling device 313 at a predetermined interval via the bus 216 and the interface 215. The servo controlling device 313 calculates an output amount of the current supplied to the servomotor 1 based on the driving instruction input from the CPU 201, and then supplies the current to the servomotor 1 to control the joint angles of the joints 111 to 116 of the robot arm 101. That is, the CPU 201 controls the driving of the joints 111 to 116 by the servomotor 1 via the servo controlling device 313, such that the angles of the joints 111 to 116 respectively reach the target joint angles.

Although not indispensable in the lost motion measurement of the first embodiment, a gravity sensor 217 can be arranged on the robot arm 101. For example, the gravity sensor 217 can be constituted by an acceleration sensor device based on to a piezoresistive type detecting method, an electrostatic capacitive type detecting method or another detecting method. The gravity sensor 217 is arranged within the base 101a so as to be able to detect, for example, the arrangement orientation of the base 101a to the horizontal plane (or the vertical axis).

The output of the gravity sensor 217 can be used as the reference in case of performing control to maintain, for example, the orientation by which the gravity center of the driven part on the hand-end side driven by the joint 112 coincides with a vertical axis g which passes through the joint axis, in the later-described second embodiment.

Here, the functions to be achieved by hardware around the CPU 201 and the HDD 204 necessary for a later-described speed reducer state monitoring process will be described with reference to FIG. 4.

Figure 4:
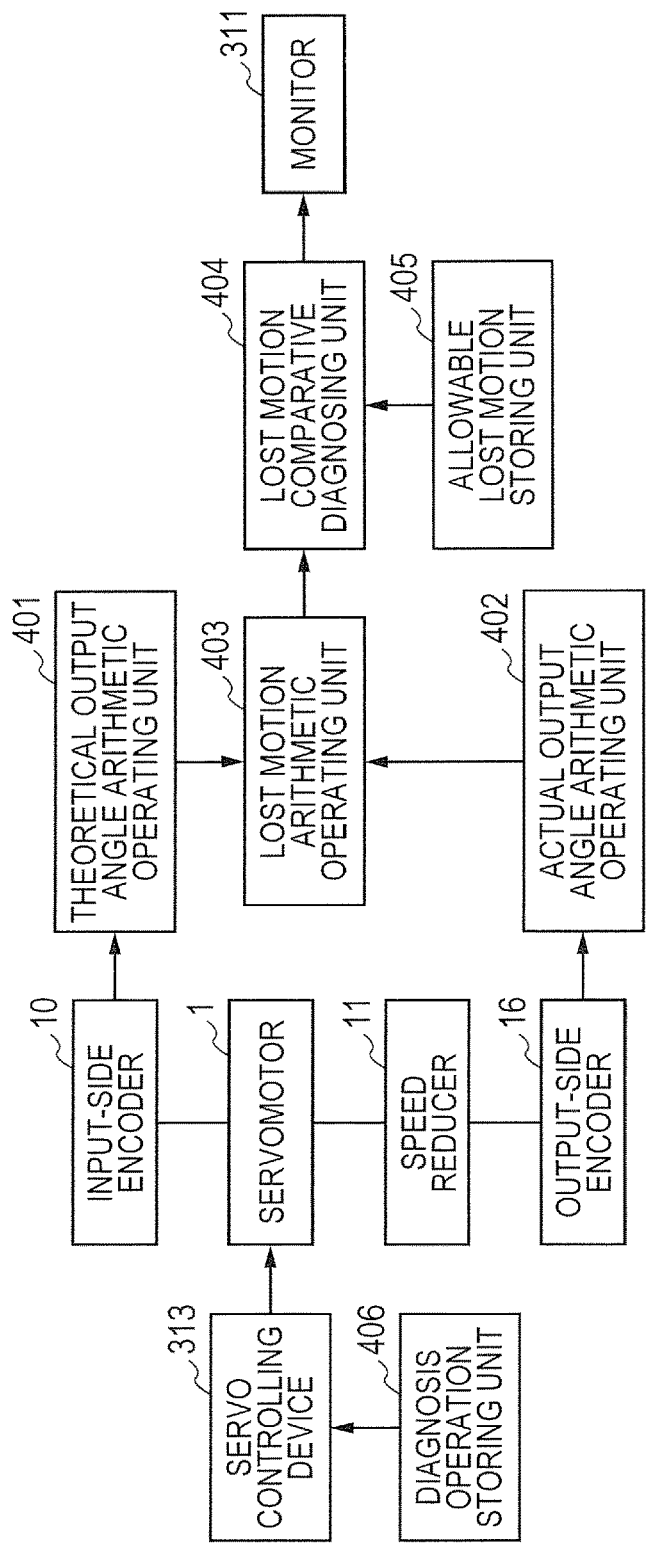
FIG. 4 is a functional block diagram for illustrating the control system of the robot apparatus according to the first embodiment.

FIG. 4 is the functional block diagram for illustrating the control system of the robot apparatus 500 according to the first embodiment. As illustrated in FIG. 4, the control system comprises a theoretical output angle arithmetic operating unit 401, an actual output angle arithmetic operating unit 402, a lost motion arithmetic operating unit 403, a lost motion comparative diagnosing unit 404, an allowable lost motion storing unit 405 and a diagnosis operation storing unit 406.

The theoretical output angle arithmetic operating unit 401 obtains an input-side rotation angle $\theta_m$ by counting the input-side pulse signals received from the input-side encoder 10, and arithmetically operates (calculates) a theoretical output angle $\theta_t$ ($=\theta_m/N$) by converting or transforming the obtained input-side rotation angle $\theta_m$ with use of a reduction ratio N. The actual output angle arithmetic operating unit 402 arithmetically operates an actual output angle (output-side rotation angle) $\theta_r$ by counting the output-side pulse signals received from the output-side encoder 16.

In the present embodiment, a different between the theoretical output angle $\theta_t$ obtained from the theoretical output angle arithmetic operating unit 401 and the actual output angle $\theta_r$ obtained from the actual output angle arithmetic operating unit 402 is considered as a lost motion ($\Delta\theta$). In the constitution illustrated in FIG. 4, the lost motion arithmetic operating unit 403 arithmetically operates the lost motion $\Delta\theta$ of the joint (e.g., 112) from the difference ($\theta_r-\theta_t$) between the arithmetic operation result of the theoretical output angle arithmetic operating unit 401 and the arithmetic operation result of the actual output angle arithmetic operating unit 402. Measurement control for obtaining the lost motion $\Delta\theta$ will later be describe in detail with reference to FIG. 6.

Also, in the speed reducer 11, a lost motion occurs mainly due to the circular spline, the flex spline and the like. More specifically, the tooth surfaces of the circular spline and the flex spline are worn according to the driving of the robot arm, i.e., a wave-gearing speed reducer thereof. The lost motion increases in proportion to the wear of the tooth surface like this. Incidentally, not only the wave-gearing speed reducer, the lifetime of a general (gear-type) speed reducer can be diagnosed based on a wear amount of its tooth surface. Therefore, if the lost motion of the speed reducer can be detected, the wear amount of the tooth surface thereof can be estimated. Thus, it is possible to diagnose the lifetime of the relevant speed reducer.

For this reason, a previously obtained allowable value (tolerance) of the lost motion has been stored in the allowable lost motion storing unit 405. Here, it is possible to determine the allowable value of the lost motion to be stored in the allowable lost motion storing unit 405, based on catalogue values or the like of the used speed reducer. For example, in a maker catalogue related to the wave-gearing speed reducer, there is a case where the values of hysteresis loss are described as, for example, an angle representation. Besides, in the present embodiment, it may be possible to use the hysteresis loss as the allowable value of the lost motion. Moreover, it may be possible, in assembling work, transporting work or the like, to obtain a lost motion value by which end accuracy of the robot deteriorates due to an increase of the lost motion and the work is thus hindered, and then use the obtained lost motion value as a threshold of the allowable lost motion.

The lost motion comparative diagnosing unit 404 compares the lost motion $\Delta\theta$ calculated by the lost motion arithmetic operating unit 403 with the allowable lost motion stored in the allowable lost motion storing unit 405. Then, when the lost motion $\Delta\theta$ exceeds the allowable lost motion, the lost motion comparative diagnosing unit 404 diagnoses that the lifetime of the relevant joint, particularly the speed reducer thereof, has come.

On the other hand, when the lost motion Δθ is equal to or smaller than the allowable value, the lost motion comparative diagnosing unit diagnoses that the relevant joint, particularly the speed reducer thereof, can be used normally. When it is diagnosed that the lifetime of the speed reducer 11 has come, the lost motion comparative diagnosing unit 404 displays a warning which indicates that the lifetime has come, on the monitor 311. Besides, a series of operations (the operation described in FIG. 6) necessary for such lifetime diagnosis, and the orientations are stored in the diagnosis operation storing unit 406.

Next, an example of the lost motion measuring method will be described with reference to FIGS. 5 and 6. Here, in order to show a simplest and basic lost motion measurement model, the lost motion measuring method for the joint 111 of FIG. 1 will be described.

Incidentally, the joint 111 of the robot arm 101 illustrated in FIG. 1 rotatably supports the link 121 on the base 101a. In the robot arm 101 as illustrated in FIG. 1, the base 101a is fixed and installed to a horizontal floor surface or the like, and thus the axis (joint axis) of rotation of the joint 111 approximately coincides with the vertical direction.

As described above, the lost motion corresponds to the control error of the rotation position (angle) of the joint (the speed reducer thereof). Therefore, when the gravity moment due to, for example, the mass of the driven part of the relevant joint acts around the joint axis, the measurement value of the lost motion is influenced by the magnitude of the moment. As for the joint 111, the mass of the driven part (the link 121 and the following parts) of the joint does not act as a rotation moment around the joint axis of the joint 111. Thus, as for the joint 111 which is the measurement target in the present embodiment, it is unnecessary to consider the influence of the mass of the driven part of this joint (that is, the driven parts on the hand-end side of this joint) on the lost motion.

Figure 5:
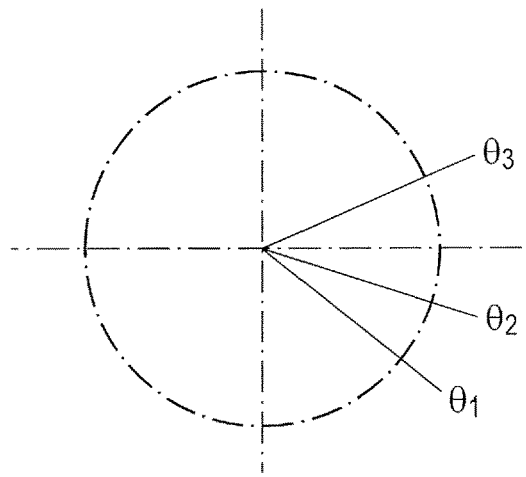
FIG. 5 is a diagram for describing a joint angle relation according to the first embodiment.

FIG. 5 is the diagram for describing an example of relation of the angles of the rotation shaft (axis) of the joint 111. In the drawing, arbitrary rotation angles $\theta_1$, $\theta_2$ and $\theta_3$ are shown. FIG. 6 is the flow chart for describing a lost motion measurement procedure according to the first embodiment. For example, the shown procedure can be stored as a control program of the CPU 201 in the HDD 204 (or ROM 202). Also, each procedure illustrated in each of the following flow charts can similarly be stored in the HDD or the ROM.

Figure 6:
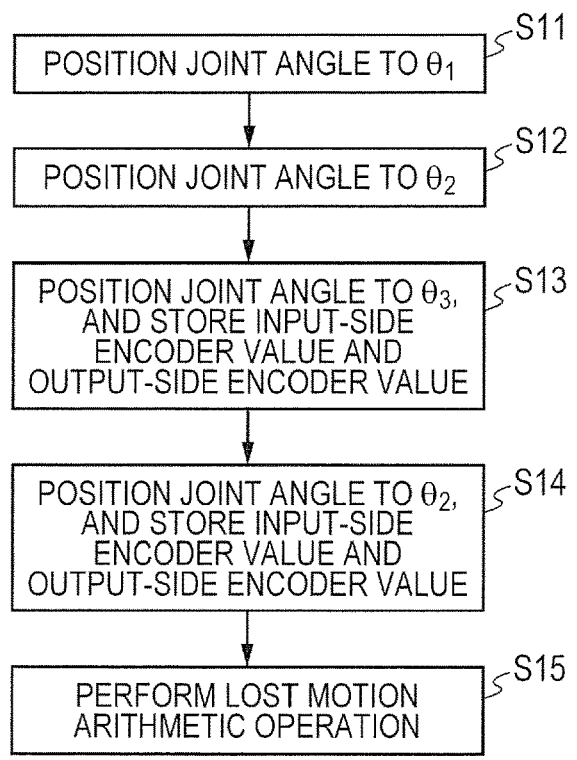
FIG. 6 is a flow chart for describing lost motion measurement control according to the first embodiment.

In the measurement procedure of FIG. 6, the motor (corresponding to the servomotor 1 in FIG. 2) of the joint 111 is driven. The rotation angle at this time is controlled by a closed loop on the basis of the input-side encoder value obtained from the input-side encoder 10.

When measuring the lost motion, in S11 of FIG. 6, the joint angle of the joint 111 is first positioned to the joint angle $\theta_1$ of FIG. 5. Next, in S12, the joint 111 is rotated (counterclockwise in FIG. 5), and the joint angle is positioned to the joint angle $\theta_2$. Such joint angle control is performed by the closed-loop control based on, for example, the input-side encoder value obtained from the input-side encoder 10.

Subsequently, in S13, the joint 111 is rotated in the same direction, the joint angle is positioned to the joint angle $\theta_2$, and the values of the input-side encoder 10 and the output-side encoder 16 are obtained (stored).

Further, in S14, the joint 111 is rotated in the direction opposite to that in S13, the joint angle of the joint 111 positioned to the joint angle $\theta_2$ of FIG. 5, and the values of the input-side encoder 10 and the output-side encoder 16 are obtained (stored).

The above operation in S11 to S12 is a so-called one-sided positioning preliminary operation to be performed prior to the operation (angle obtaining process) in S13 to S14. The one-sided positioning preliminary operation is performed to move the lost motion to one side at least at the start of S13. That is, the one-sided positioning is performed at each of the joint angles $\theta_2$ and $\theta_3$ respectively being the start and end points of the lost motion measurement, so as to control the influence of an initial error of the lost motion to 0 (or minimum). For example, as for the joint 111 in the present embodiment, in the case where the gravity moment of the driven part of the joint does not act on the joint axis of the relevant joint, it is possible to perform the one-sided positioning preliminary operation like this. It is necessary to make the rotation directions of the joint 111 the same in case of performing the one-sided positioning in S12 and S13, and it is also necessary to set the joint rotation amount ($\theta_3-\theta_2$) of the rotation by the forward and reverse operations of a motor to be larger than the lost motion amount supposed in the driving system of the target.

Figure 7:
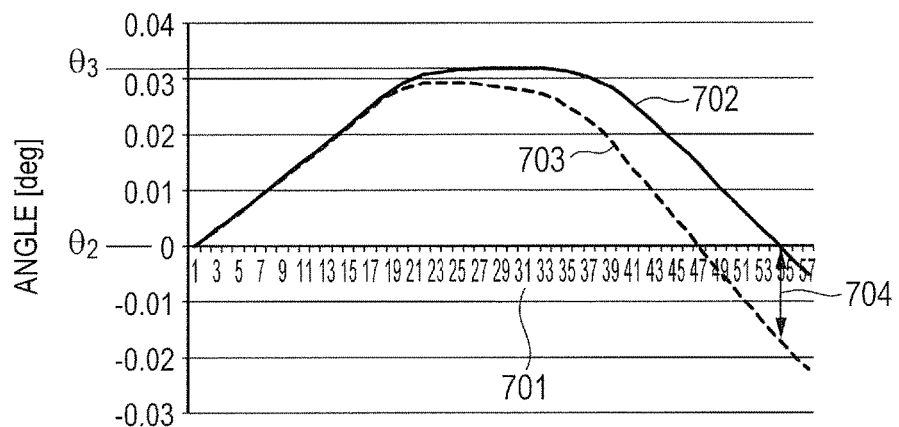
FIG. 7 is a graph for indicating lost motion measurement data according to the first embodiment.

FIG. 7 is the graph for exemplarily indicating an example of the experimental result of the present embodiment, that is, wave shapes of measurement data. Numerical values (701) of the horizontal axis of FIG. 7 indicate measurement sampling order. The vertical axis of FIG. 7 indicates the joint angles (θ). The wave shapes of a theoretical output shaft (axis) angle 702 (solid line) and an actual output angle 703 (broken line) measured by the output-side encoder 16 are shown in this graph. The theoretical output shaft angle 702 (solid line) is the control value which is arithmetically operated by, for example, the theoretical output angle arithmetic operating unit 401 using the output value of the input-side encoder 10. In FIG. 7, to simplify the description, respective initial values $\theta t_0$ and $\theta r_0$ of the theoretical output shaft angle 702 and the actual output angle 703 are given as follows.

$$\theta t_0 = \theta r_0 = \theta_2 = 0° \quad (1)$$

In the above expression (1), $\theta t_0$ is the initial value of the theoretical output shaft angle 702, and $\theta r_0$ is the initial value of the actual output angle 703.

In the graph of FIG. 7, the theoretical output shaft angle 702 and the actual output angle 703 are not different in the vicinity of the respective initial values, but a difference occurs in the middle. In FIG. 7, for example, in the outward way of the forward and reverse rotations from the joint angle $\theta_2$ to the joint angle $\theta_3$, the rotation is started from the one-sided positioning state of the lost motion (S11, S12), and the actual output angle 703 well follows the theoretical output shaft angle 702.

However, in the homeward way from the joint angle to the joint angle $\theta_2$ by reversing the rotation direction of the joint 111 at the joint angle $\theta_3$ (S13, S14), the actual output angle 703 gradually deviates from the theoretical output shaft angle 702 due to the influence of the lost motion of the mechanism. A difference (704) between the actual output angle 703 ($\theta_r$) and the theoretical output shaft angle 702 ($\theta_t$) corresponds to the lost motion.

In S15 of FIG. 6, the arithmetic operation for the lost motion is performed (lost motion calculating process). In the calculating method at this time, for example, the difference between the given actual output angle 703 and the theoretical output shaft angle 702 at the joint angle $\theta_2$ (S14) is used as the measurement value of the lost motion. Here, the actual output angle 703 is converted into an angle value obtained from the output-side encoder 16, and the theoretical output shaft angle 702 is converted into an angle of the output side by using the reduction ratio N to the output value of the input-side encoder 10 as described above.

Incidentally, in S15, it may be possible to calculate, as the lost motion measurement value, the value obtaining by subtracting the lost motion value at the joint angle $\theta_3$ (S13: initial angle) from the lost motion value at the joint angle $\theta_2$ (S14: stop angle). That is, since the values of the input-side encoder 10 and the output-side encoder 16 are obtained also at the joint angle $\theta_2$ (S14: stop angle), it is possible to calculate the lost motion value also at this angle in the same manner as above. The lost motion value at the joint angle $\theta_2$ (initial angle) is subtracted from the lost motion value at the joint angle $\theta_3$ (stop angle). By the arithmetic operating method like this, even if the one-sided positioning control is not sufficient by the preliminary operation (S11, S12), the lost motion component at the joint angle $\theta_2$ (initial angle) occurred in such insufficiency can be eliminated. Thus, it is possible to obtain a higher-reliability measurement value.

As described above, it is possible to measure the lost motion of the speed reducer via the input-side encoder value and the output-side encoder value by performing the rotation control of the joint 111 of the robot arm 101. Moreover, it is possible to diagnose the lifetime by comparing the measured lost motion with the previously stored allowable lost motion.

Figure 8:
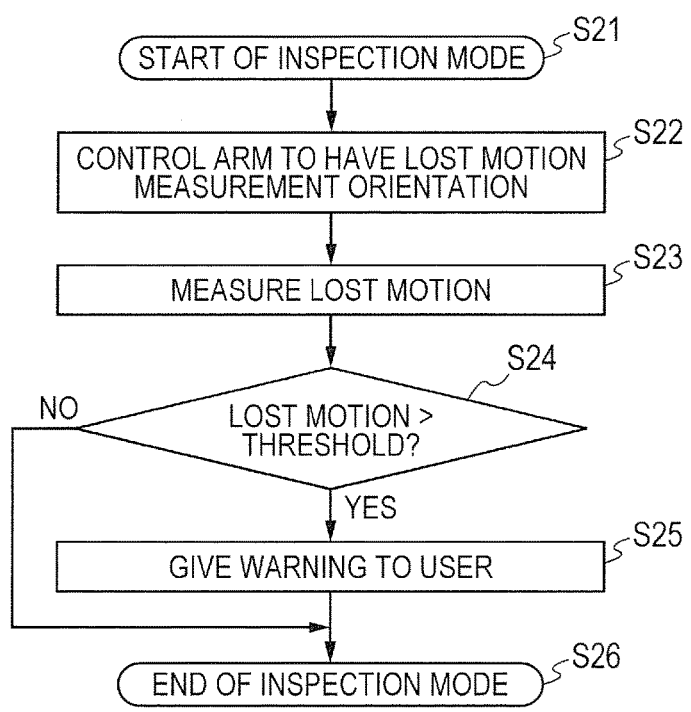
FIG. 8 is a flow chart for describing a lifetime diagnosing process according to the first embodiment.

FIG. 8 is the flow chart for describing an example of the control procedure in an inspection mode for lifetime diagnosis of the joint 111. In the procedure of FIG. 8, in S21, a user (administrator) of the robot arm 101 selects the mode of starting an inspection for the lifetime diagnosis.

Next, in S22, the robot arm is controlled to have a lost motion measurement orientation previously registered in the diagnosis operation storing unit 406. The joint angle at this time is $\theta_1$ in the example of the joint 111 shown in FIG. 6.

Subsequently, in S23, the measurement procedure (measuring step) of FIG. 7 is performed to measure the lost motion. The measurement procedure (measuring step) in S23 is the same as the process from S11 to S15 of FIG. 6.

Next, in S24, the lost motion measured in S23 is compared with the allowable value (threshold) registered in the allowable lost motion storing unit 405. When it is decided in S24 that the lost motion measured in S23 is larger than the allowable value registered in the allowable lost motion storing unit 405, it is diagnosed in S25 that the lifetime of the speed reducer has come, and thus a warning is sent to the user. On the other hand, when it is decided in S24 that the measured lost motion is not larger than the allowable value, the inspection mode is normally ended (S26).

When the process is advanced from S24 to S26 for the normal end of the inspection mode, it may be possible to explicitly notify the user that the lifetime of the speed reducer still remains. When performing the warning in S25 and/or such normal end notification, for example, it is possible to use the display of the teaching pendant 300, a separately provided not-illustrated display, or a not-illustrated voice synthesizing and voice outputting means. Also, it is possible to perform various information notifications in the later-described embodiments, by such a notification means as above using display and voice outputs.

As described above, by the robot apparatus 500 in the first embodiment, it is possible to measure the looseness by externally setting the measuring device or perform the diagnosis without taking the robot arm apart, for the purpose of the lifetime diagnosis for the speed reducer of the robot arm 101.

In the above description, the servomotor 1 and the speed reducer 11 are directly connected to each other in FIG. 2, for example. However, it is conceivable to arrange a transmission (transfer) system such as a timing belt or the like between the servomotor and the wave gearing mechanism (speed reducer). Also, in such a constitution, it is possible, by previously performing an experiment or the like, to determine the allowable value of the lost motion to be stored in the allowable lost motion storing unit 405.

Second Embodiment

Subsequently, the robot apparatus according to the second embodiment of the present invention will be described with reference to FIGS. 9 to 12B. Although the entire constitution of the robot apparatus is the same as that illustrated in FIG. 1, a reference symbol 500A of FIG. 1 is used as to the robot apparatus according to the second embodiment as a matter of convenience.

In the above first embodiment, the constitutions for performing the lost motion measurement and the lifetime diagnosis have been described for, by way of example, the joint 111 in which the mass of the driven part of the joint to which the lost motion measurement is performed does not act as the gravity moment around the joint axis thereof. That is, in the first embodiment, sine the joint axis of the joint 111 approximately coincides with the vertical direction, the rotation moment (gravity moment) generated by the mass of the driven part at the hand-end side of the joint 111 does not act around this joint axis. Besides, the joint 111 corresponds to a so-called first joint on the closest side of the base 101a, and the orientation of the joint axis thereof to the vertical direction or the horizontal surface does not influence the position and the orientation of other portions of the arm.

In contrast, in the arum constitution as illustrated in FIG. 1, there is a possibility that, in the second joint, i.e., the joint 112, and the following joints which are located on the hand-end side, the gravity moment acts around the joint axis or the magnitude of the gravity moment changes due to the mass of the driven part according to the orientation of the relevant driven part of the second or following joint.

Therefore, in the arm constitution as illustrated in FIG. 1, to perform the lost motion measurement and the lifetime diagnosis based thereon as for the joint 112 and the following joints on the hand-end side, it is necessary to perform control in consideration of the gravity moment acting around the joint axis based on the mass of the driven part of the related joint.

For example, a gravity moment condition controlling method as described below is roughly conceivable. That is, in case of the joint driving for the lost motion measurement, the gravity moment acting around the joint axis by the mass of the driven part of the joint is controlled to a specific state. For example, during the joint driving for the lost motion measurement, the gravity moment is controlled to maintain a constant condition as much as possible, that is, the gravity moment is controlled to a condition that the gravity moment is 0 or minimum.

In the second embodiment, as described above, an example of an operation of controlling the gravity moment condition and measuring the lost motion in the lost motion measuring process, and of diagnosing the lifetime based on the measured lost motion will be described. Hereinafter, in the second embodiment, the lost motion measurement control will be described for, by way of example, the joint 112 in which the relatively large gravity moment acts around the joint axis thereof by the mass (its own weight) of the driven part of the relevant joint.

Incidentally, the constitution of the second embodiment is directed to a technique of performing orientation control of the robot arm such that the joint driving is performed within a range that the gravity moment around the joint axis is smaller than driving resistance of the joint driving system, concretely a frictional torque (frictional resistance), or only the gravity moment within that range is generated. The driving resistance of the relevant joint driving system acts as resistance (load) for performing self-holding such that a lost motion does not generate against the gravity moment around the joint axis generated due to the own weight of the robot arm. In the present embodiment, it is controlled to perform the orientation control of the robot arm such that the joint driving is performed within the range smaller than the frictional torque (frictional resistance), or only the gravity moment within that range is generated.

Figure 9:
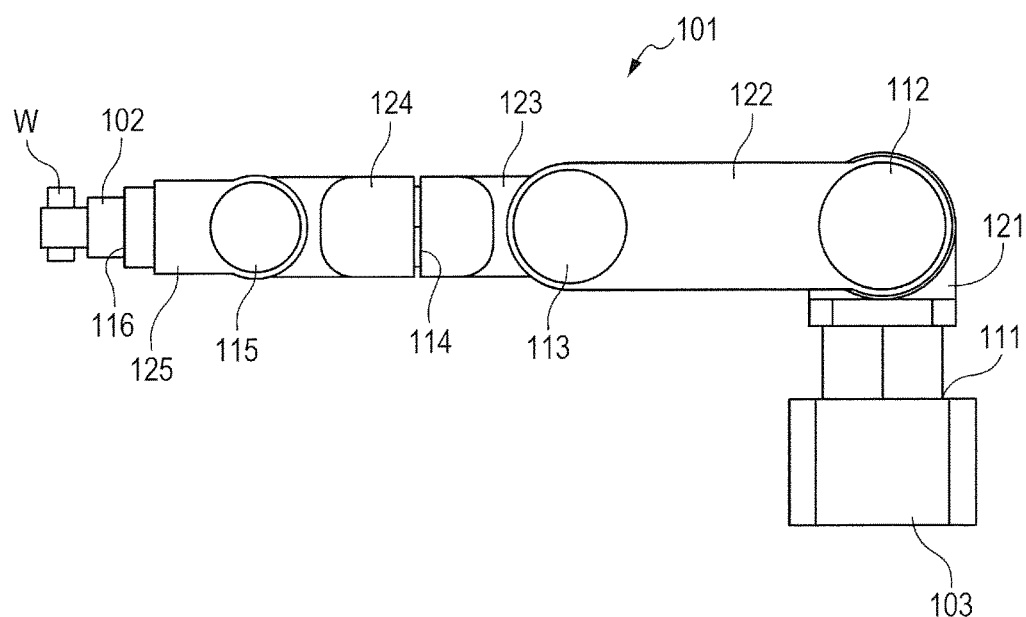
FIG. 9 is a diagram for describing a gravity moment acting on the robot arm.
Figure 10:
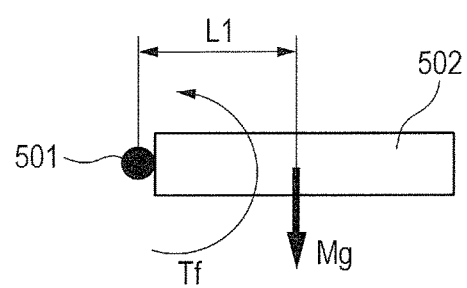
FIG. 10 is a diagram for describing balance of the gravity moment of FIG. 9.

FIG. 9 is the diagram for describing an example of the orientation of the robot arm 101 by which the relatively large gravity moment acts around the joint angle of the joint 112, and FIG. 10 is the diagram for describing moment balance in the arm orientation illustrated in FIG. 9. In particular, FIG. 10 illustrates the state which is obtained by right/left reversing the state illustrated in FIG. 9, and shows a joint axis (center of rotation) 501 of the joint 112 and a driven part 502 corresponding to the hand-end parts including the link 122 and the following parts.

FIG. 10 further shows motion mass M of the driven part 502 at the hand-end side from the joint 112, a distance L1 from the joint axis 501 and the gravity center of the motion mass M, a frictional torque (frictional resistance) Tf of a cross roller bearing or the like provided in the joint 112, and gravity acceleration g. Here, the gravity moment acting around the joint axis 501 is given as MgL1.

In the state shown in FIGS. 9 and 10, it is assumed that the gravity moment MgL1 is larger than the frictional torque Tf (Tf<MgL1). In this state, since the gravity moment MgL1 cannot be supported only by the frictional torque Tf, a rotation moment acts on the speed reducer (11 of FIG. 2) of the joint 112. The magnitude of this rotation torque is strictly the difference between the gravity moment MgL1 and the frictional torque Tf (MgL1−Tf). The tooth surface of the speed reducer comes to be in contact by predetermined pressure because of this rotation moment (MgL1−Tf), and thus a so-called one-sided positioning state occurs. In the one-sided positioning state like this, it is difficult to measure the lost motion by the method described in the first embodiment.

Figure 11A:
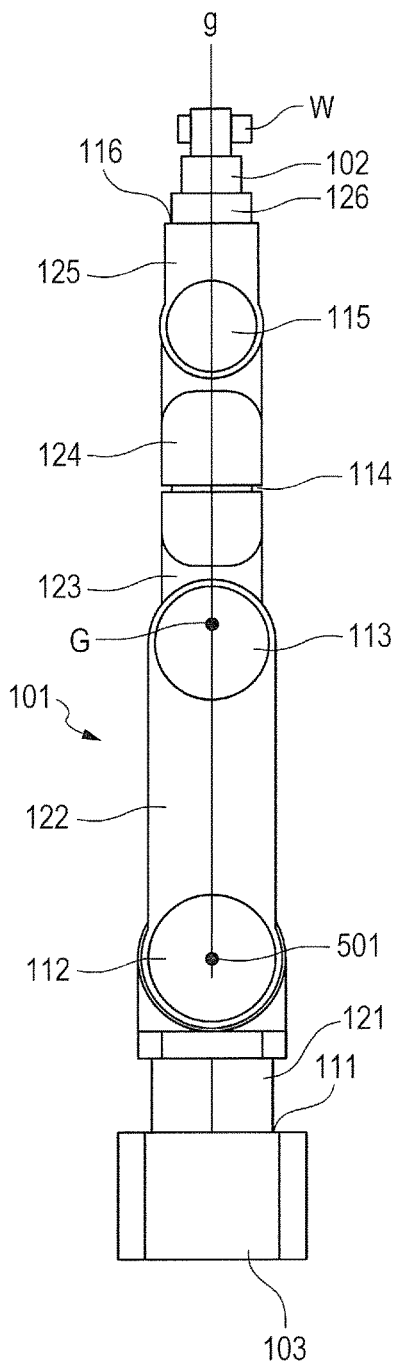
FIGS. 11A and 11B are diagrams for respectively illustrating different orientations of the robot arm at a time of lost motion measurement according to the second embodiment.
Figure 11B:
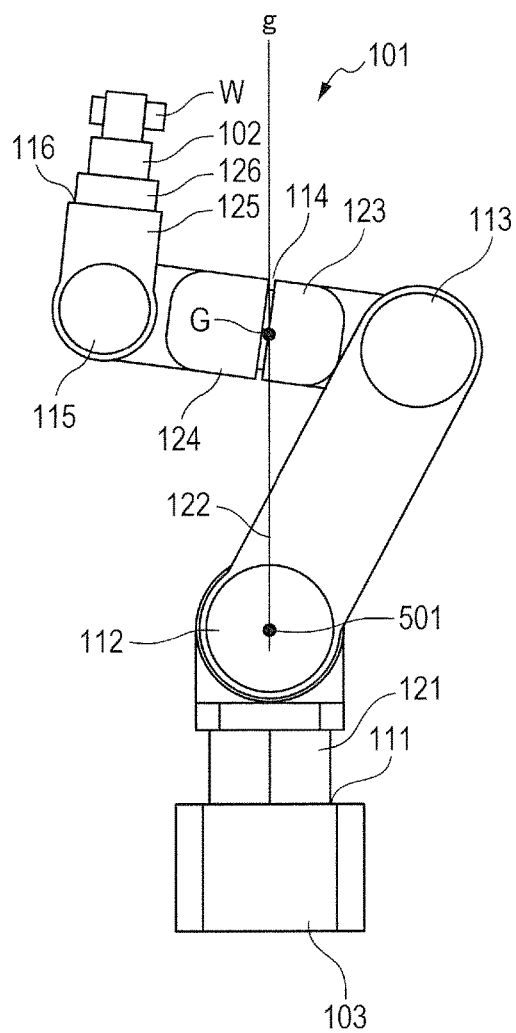

On the other hand, orientations of the robot arm 101 as illustrated in FIGS. 11A and 11B are conceivable. In both FIGS. 11A and 11B, a gravity center G of the driven parts (that is, the link 122 and the following parts) on the hand-end side driven based on the joint angle 501 (center of rotation) of the joint 112 is at the position which approximately coincides with the vertical axis g passing through the joint axis 501.

Figure 12A:
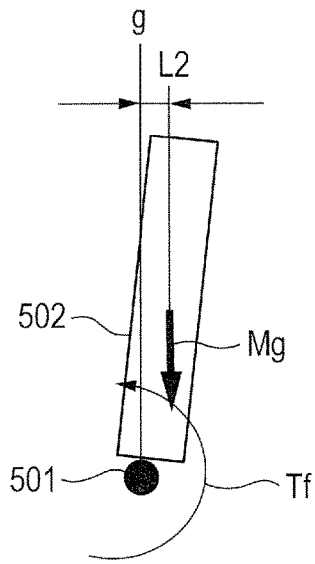
FIG. 12A is a diagram for describing moment balance in FIGS. 11A and 11B.

In the state like this, as illustrated in FIG. 12A, a gravity moment MgL2 is smaller than the frictional torque Tf of the joint 112. In FIG. 12A, the reference numerals 501 and 502 respectively denote the joint axis of the joint 112 and the driven part on the hand-end side rotatably supported by the joint 112, as well as FIG. 10. The reference symbol L2 denotes the distance between the joint axis 501 and the gravity center (G in FIGS. 11A and 11B) of the motion mass M of the driven part 502. The gravity moment at this time is given as MgL2.

In FIG. 12A, to facilitate understanding, the gravity center (G in FIGS. 11A and 11B) of the motion mass M is intentionally positioned out of the vertical axis g passing through the joint axis 501. In this case, since the distance L2 is not 0, the gravity moment MgL2 slightly smaller than the frictional torque Tf acts on the joint axis. If the gravity center (G in FIGS. 11A and 11B) of the motion mass M is at the position which coincides with the vertical axis g passing through the joint axis 501, since the distance L2 is 0, the gravity moment does not act on the joint axis 501 (MgL2=0).

That is, the states in FIGS. 11A, 11B and 12A are the state that the gravity moment MgL2 is smaller than the frictional torque Tf (Tf>MgL2). While this state is being held, it is possible to support the gravity moment MgL2 only by the frictional torque Tf. Conversely, since the rotation moment (MgL2−Tf) which overcomes the frictional torque Tf of the joint 112 and thus causes the one-sided positioning does not act, the one-sided positioning state to be controlled as an unexpected disturbance as in the case of FIGS. 9 and 10 does not occur.

It is possible, by using the orientation (control) as in FIGS. 11A and 11B, to in fact cancel the one-sided positioning, i.e., a lost motion error, due to the gravity moment generated by the driven part, and it is thus possible to measure (only) the lost motion within a specific joint rotation range.

As such, there is a method of setting the initial angle ($\theta_3$ in the first embodiment) of the joint 112 to either the state of FIG. 11A or the state of FIG. 11B, obtaining the values of the input-side encoder 10 and the output-side encoder 16 (corresponding to S13 of FIG. 6), subsequently rotating the joint 112 from the initial angle ($\theta_3$ in the first embodiment) to the stop angle ($\theta_2$ in the first embodiment) within the range of small rotation angle, then obtaining the values of the input-side encoder 10 and the output-side encoder 16 (corresponding to S14 of FIG. 6), and thereafter obtaining the lost motion measurement value by performing the lost motion arithmetic operation (corresponding to S15 of FIG. 6) same as that described in the first embodiment. At this time, as the measurement range from the initial angle ($\theta_3$ in the first embodiment) to the stop angle ($\theta_2$ in the first embodiment), the range in which the state that the gravity moment MgL2 is smaller than the frictional torque Tf (Tf>MgL2) is maintained is selected. For example, it is possible to obtain the measurement range from the initial angle ($\theta_3$ in the first embodiment) to the stop angle ($\theta_2$ in the first embodiment), in accordance with the specification of the robot arm 101, particularly the weight of the driven part of the target joint, the specification of the speed reducer used in the joint, or the like, or on the basis of actual measurement previously performed.

Besides, as another method of using the orientation (control) as in FIGS. 11A and 11B, there is a method of setting the initial angle ($\theta_3$ in the first embodiment) of the joint 112 to the angle of FIG. 11A, setting the stop angle ($\theta_2$ in the first embodiment) to the angle of FIG. 11B, and performing the orientation control of the driven part in synchronism (conjunction) with the rotation of the joint 112 from the initial angle ($\theta_3$ in the first embodiment) of FIG. 11A to the stop angle ($\theta_2$ in the first embodiment) of FIG. 11B. For example, the orientation control is performed such that the driven part (link 122 and the following parts) of FIG. 11A transitions from the orientation that stands erect along the vertical axis g to the orientation that the gravity center G of the driven part balances on the vertical axis g as shown in FIG. 11B. All that time, the angle of each of the joint 113 and the following joints on the hand-end side is dynamically controlled in synchronism with the rotation of the joint 112 so as to always maintain the orientation that the gravity center G of the driven part of the joint 112 approximately coincides with the vertical axis g passing through the joint axis 501. The control like this is achieved by the control procedure as illustrated in, for example, FIG. 12B.

Figure 12B:
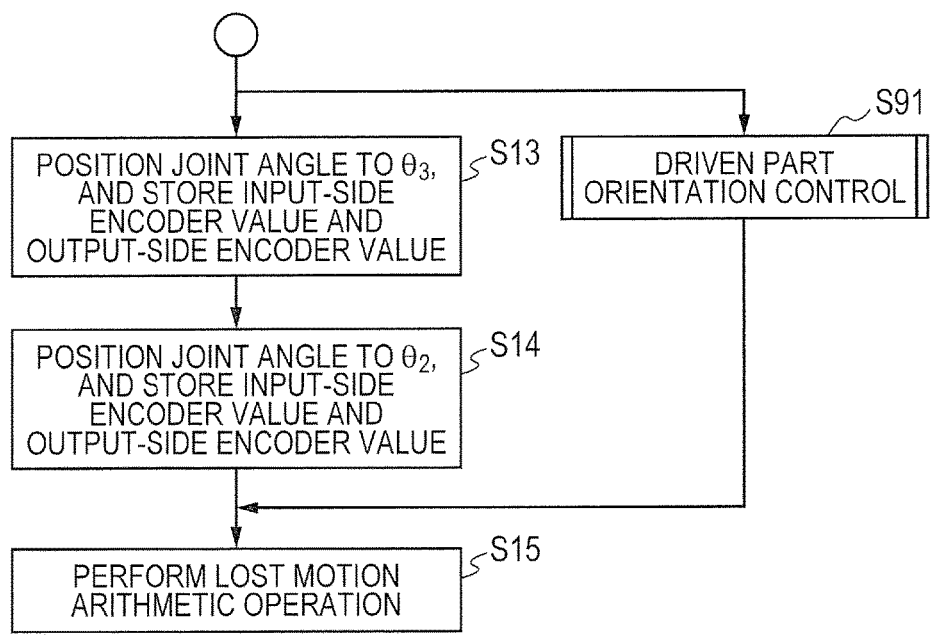
FIG. 12B is a flow chart for describing lost motion measurement control according to the second embodiment.

FIG. 12B is the flow chart corresponding to that of FIG. 6 in the first embodiment. More specifically, the process from S13 to S15 of FIG. 6 is extracted in this flow chart. In synchronism with the rotation of the joint 112 in S13 to S14, synchronous control of the driven part is performed in S91 to be performed parallelly. The orientation control routine of the driven part in S91 can be installed as another process or another thread to be synchronously (parallelly) executed by the CPU 201. In the orientation control routine for the driven part in S91, as described above, the orientation control of the driven part is performed so as to maintain the orientation that the gravity center G of the driven part of the joint 112 coincides with the vertical axis g passing through the joint axis 501 in synchronism with the rotation of the joint 112.

It is possible to previously determine the control pattern of the gravity center G of the driven part necessary for the orientation control of the driven part (link 122 and the following parts) in S91 of FIG. 12B, in accordance with the arm specification, the condition such as the weight of each part, or the like. In the description of the second embodiment, the joint 112 is used by way of example. However, it is possible to also apply the control of FIG. 12B to measure another joint, if the gravity center (G) of the driven part driven by the relevant joint can be controlled within the range necessary for measurement. In this case, it is of course possible to previously determine the control pattern of the gravity center G of the driven part in S91 for each joint in accordance with the specifications of the arm and the joint. Besides, it is possible by the CPU 201 to arithmetically operate (calculate) the position of the gravity center G of the driven part in relation to the measurement-target joint on the basis of, for example, design information such as the shape and the weight of each part of the arm.

It is possible to previously program the pattern of the orientation control (S91) of the robot arm 101 by which the orientation that the gravity center G of the driven part of the joint 112 coincides with the vertical axis g passing through the joint axis 501 can be maintained, in synchronism with the driving of the joint 112 at the time of measurement. For example, the orientation control pattern of the robot arm 101 like this is formed based on a default installation orientation by which the bottom surface of the base 101a is horizontal in regard to the horizontal surface (or vertical in regard to the vertical axis). In this case, if the robot arm 101 has been installed with the orientation different from the default installation orientation, it is necessary to change (correct) the orientation control pattern of the robot arm 101 to become different from the previously programmed pattern. The orientation control pattern of the robot arm 101 at the time of the measurement to be changed (corrected) includes the driving angle of the joint 112 at the time of the measurement and the orientation control of the driven part in S91.

Thus, in a case where the gravity sensor 217 (FIG. 3) is provided in advance, when performing the measurement control in FIG. 12B, the CPU 201 can change (correct) the previously prepared orientation control pattern of the robot arm 101 according to the installation orientation of the base 101a by using the gravity sensor 217. For example, in the measurement control of FIG. 12B, the CPU 201 can change (correct) the parameter such as the initial angle of each joint or the like, by using the inclination angle to the horizontal surface (or vertical axis) of the base 101a detected by the gravity sensor 217. In this case, for example, the CPU can change (correct) the initial angle ($\theta_3$ in the first embodiment) of the joint 112 at the time of the measurement and the initial angles of the joint 113 and the following driven parts in S91, according to the inclination angle of the base 101a detected by the gravity sensor 217.

As described above, according to the second embodiment, it is possible, as to the joint (e.g., 112) in which the relatively large gravity moment acts around the joint axis by the mass of the driven part thereof, to measure the lost motion in the state that the measurement error occurred by the gravity moment is practically cancelled. For example, in the joint 112, there is a possibility that the lost motion is one-sided positioned by the gravity moment generated by the driven part in the orientation as in FIG. 9, and thus a measurement error of the lost motion occurs.

On the other hand, according to the present embodiment as described with reference to FIGS. 11A, 11B and 12A, in the angle obtaining process, the lost motion is measured within the range that the gravity moment MgL2 of the driven part is smaller than the driving resistance, i.e., the frictional torque Tf. Alternatively, as described with reference to FIG. 12B, in the measuring process, the lost motion within the specific joint rotation range is measured, while performing the orientation control of the driven part such that the gravity moment MgL2 can be more actively maintained to be smaller than the driving resistance, i.e., the frictional torque Tf. More specifically, in the case of the joint 112, the orientation control of the driven part is performed such that the gravity center G of the driven part approximately coincides with the vertical axis g passing through the joint axis 501. In any case, the lost motion is measured via the difference between the detection angles (positions) of the input-shaft and output-shaft encoders of the speed reducer 11 in the specific joint rotation range.

That is, according to the second embodiment, even as for the joint (e.g., 112) in which the relatively large gravity moment acts around the joint axis due to the mass (own weight) of the driven part, it is possible to practically cancel the measurement error caused by the gravity moment, and thus accurately measure the lost motion. Moreover, it is possible, according to the lost motion measurement result, to accurately diagnose the lifetime of the joint, particularly the speed reducer serving as the driving system thereof, with high reliability, in the same manner as that in the first embodiment.

Incidentally, the CPU 201 positions the measurement-target joint with an arbitrary orientation (rotation angle), and stops driving the servomotor 1 of the joint at that position. The CPU monitors the outputs values of the input-side encoder 10 and the output-side encoder 16 before and after the stop of the driving. When the output values of the input-side and output-side encoders do not change before and after the stop of the driving, the CPU 201 can decide (confirm) that the rotation angle (joint angle) corresponds to the orientation by which the gravity moment MgL2 by the driven part is smaller than the driving resistance, i.e., the frictional torque Tf. At this time, the orientation of the driven part of the measurement-target joint is controlled to the orientation by which, for example, the gravity moment acting around the relevant joint becomes small as much as possible.

By performing the gravity moment confirming process like this for several joint angles in a proper range of the joints of the robot arm 101, it is possible to specify the range of the joint angle by which the gravity moment MgL2 is smaller than the frictional torque Tf, for each joint. For example, it is possible to previously perform such a range specifying process of specifying the angle range in which the lost motion can be measured without an influence of the gravity moment, for each of the respective joints of the robot arm 101 of the actual apparatus. Thus, it is possible, according to a result of the range specifying process like this, to determine the angle ranges of the respective joint angles $\theta_3$ and $\theta_2$ being the start and end points of the lost motion measurement, for each individual robot arm 101 of the actual apparatus.

Incidentally, when the end effector at the end of the robot arm 101 is exchanged, the geometric constitution of the arm changes. Thus, when the gravity condition (mass and/or gravity center position) related to the specific joint changes due to the change of the geometric constitution, it is necessary to change the control conditions of the joint angles $\theta_3$, $\theta_2$ and the like.

Third Embodiment

Subsequently, lost motion measurement control according to the third embodiment of the present invention will be described with reference to FIGS. 13 and 14. A reference symbol 500B of FIG. 1 is used as for the robot apparatus according to the present embodiment. As well as the second embodiment, it is assumed that the hardware constitution and the software configuration in the present embodiment are the same as those described in the first embodiment.

In the second embodiment, the condition of the gravity moment acting around the joint axis of the measurement-target joint is controlled by controlling the orientation of the driven part at the hand-end side of the measurement-target joint. In particular, the condition is controlled such that the gravity moment MgL2 generated by the driven part is smaller than the frictional torque Tf.

However, it is not always possible to perform the orientation control of the driven part as described with reference to FIGS. 11A to 12B. For example, in an actual production site such as a factory or the like for producing workpieces such as industrial products, since there is a possibility that various objects or physical bodies which may interfere movements of the arms are arranged, there is a case where the orientation control of the driven part as described in the second embodiment cannot be performed. Consequently, in the third embodiment, a method of measuring the lost motion by using a section in which an overshoot of the joint operation occurs will be described.

In the present embodiment, the measurement-target joint is rotated from a joint angle ($\theta_4$ below) to a joint angle ($\theta_5$ below), and the rotation driving direction of the joint is reversed at the joint angle $\theta_5$. By such an operation, the actual joint angle is not immediately reversed in synchronism with the reverse driving because of inertia of the entire driving system, and the actual joint reversal is started from a reverse angle which overshoots or overruns the joint angle ($\theta_5$ below) to some extent. Such a phenomenon is sometimes called an overshoot. Also, the overshoot like this is observed at each of the respective encoders (10, 16) provided at both the input and output shafts of the speed reducer (11).

In the present embodiment, as a method of measuring the lost motion without actively controlling the condition of the gravity moment acting around the joint axis, such an overshoot section as described above occurred at the reverse driving of the joint is used.

Incidentally, in the present embodiment, it is assumed that the measurement-target joint is the joint 112 in which the relatively large gravity moment acts on as well as the second embodiment. Besides, although the orientation of the driven part at the hand-end side of the measurement-target joint (112) is arbitrary, it is preferable, when measuring a specific joint, to control the orientation of the driven part to the relevant specific joint to be always constant.

Figure 13:
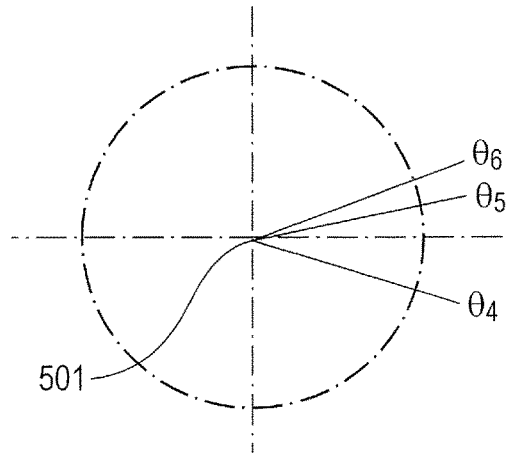
FIG. 13 is a diagram for describing driving angles of a measurement-target joint according to the third embodiment.

FIG. 13 is the diagram for describing a measuring method of the present invention in which the overshoot section at the reverse driving time is used. In the present embodiment, the measurement-target joint (112) is rotated from the joint angle $\theta_4$ to the joint angle $\theta_5$ of FIG. 13, and the rotation driving direction of the joint is reversed at the joint angle $\theta_5$. In the present embodiment, it is assumed that the constitution of the robot arm 101 is the same as that described in the previous embodiment (for example, FIGS. 11A and 11B).

Moreover, in FIG. 13, it is assumed that the vertical axis coincides with the vertical (longitudinal) direction, and the joint angles $\theta_5$ and $\theta_6$ are in the state that the gravity moment is generated in the direction of the joint angle $\theta_4$. When the joint rotation driving direction is reversed at the joint angle $\theta_5$, the overshoot occurs in the direction opposite to the gravity moment. In fact, the joint overshoots the joint angle $\theta_5$ up to, for example, the joint angle $\theta_6$.

In the present embodiment, in the overshoot section from the joint angle $\theta_5$ to the joint angle $\theta_6$, the lost motion of the relevant joint is measured via the input-side encoder 10 and the output-side encoder 16. Here, the overshoot section (between $\theta_5$ and $\theta_6$) of the joint (112) is dynamically considered. Namely, the gravity moment according to the mass and the orientation of the driven part is applied to the joint axis in the clockwise ($\theta_5 \rightarrow \theta_4$) direction of FIG. 13. The motor (servomotor 1) of the joint (112) is reversely driven from the joint angle $\theta_5$, and such driving force acts in the clockwise ($\theta_5 \rightarrow \theta_4$) direction of FIG. 13 as well as the corresponding gravity moment.

However, in the overshoot section (between $\theta_5$ and $\theta_6$), the joint is moved in the counterclockwise ($\theta_5 \rightarrow \theta_6$) direction of FIG. 13 because of inertia of the driving system. That is, in the overshoot section (between $\theta_5$ and $\theta_6$), the inertia which occurred according to the setting of the motor driving force of the joint angles $\theta_4 \rightarrow \theta_5$ overcomes the gravity moment and the motor driving force, and thus the joint (112) moves or acts in the counterclockwise ($\theta_5 \rightarrow \theta_6$) direction.

In the present embodiment, whenever the lost motion is measured, the motor driving force of the joint angles $\theta_4 \rightarrow \theta_5$ is controlled to occur the certain overshoot section ($\theta_5 \rightarrow \theta_6$), and the lost motion is measured in the overshoot section ($\theta_5 \rightarrow \theta_6$). In the overshoot section ($\theta_5 \rightarrow \theta_6$), it is possible to measure the lost motion of the mechanism under a certain condition of the overshoot operation occurred by the certain inertia.

In the overshoot section from the joint angles $\theta_5$ to $\theta_6$, the output values of the input-side encoder 10 and the output-side encoder 16 of the measurement-target joint (112) are recorded. Then, the lost motion of the measurement-target joint (112) is measured based on a change of the difference between the input-side encoder 10 and the output-side encoder 16.

For example, the maximum value of the difference between the input-side encoder 10 and the output-side encoder 16 in the overshoot section (between $\theta_5$ and $\theta_6$) is set as the measurement value of the lost motion of the measurement-target joint (112). Alternatively, it may be possible to adopt an arithmetic operating method of setting a value obtained by subtracting the minimum value of the difference between the input-side encoder 10 and the output-side encoder 16 in the overshoot section (between $\theta_5$ and $\theta_6$) from the maximum value thereof, as the measurement value of the lost motion.

When the lost motion of the specific joint (112) is measured, for example, the CPU 201 controls the driving condition of the servomotor 1 so as to occur the overshoot up to the certain joint angle $\theta_6$ (or exceeding this angle), while monitoring the output value of the output-side encoder 16. Here, the section in which the output values of the input-side encoder 10 and the output-side encoder 16 of the measurement-target joint (112) are recorded is surely set to the section of the certain joint angles $\theta_5$ to $\theta_6$.

It is necessary to make the joint angle of the above overshoot section (between $\theta_5$ and $\theta_6$) larger than a lost motion amount supposed for the relevant joint. To secure such an overshoot amount (between $\theta_5$ and $\theta_6$), for example, the CPU 201 controls to occur the overshoot up to the joint angle $\theta_6$ by controlling joint driving speed (or further reverse driving speed from the joint angle $\theta_5$) in the joint angles $\theta_4$ to $\theta_5$.

For example, it is possible to determine the driving condition under which the overshoot occurs up to the joint angle $\theta_6$, by repeatedly performing the driving of the joint angles $\theta_4 \rightarrow \theta_5$ and the reverse driving at the joint angle $\theta_5$ while monitoring the output of the output-side encoder 16. In case of trying to repeatedly perform the driving of the joint angles $\theta_4 \rightarrow \theta_5$ and the reverse driving at the joint angle $\theta_5$, for example, the recording of the output values of the input-side encoder 10 and the output-side encoder 16 is started from the reverse driving start point at the joint angle $\theta_5$ every time. Then, at the point when the overshoot up to the joint angle $\theta_6$ can be confirmed, it is possible to perform the measurement control to stop the output value recording of the respective encoders (10, 16) and end the measurement.

For example, it may be possible to previously determine the driving speed of the joint in the joint angles $\theta_4$ to $\theta_5$ by which the overshoot up to the joint angle $\theta_6$ occurs, by previously performing actual measurement of the driving speed and the overshoot angle for the measurement-target joint.

In the present embodiment, the gravity moment acting on the measurement-target joint is not actively controlled. Instead, the overshoot section (between $\theta_5$ and $\theta_6$) is set as the certain angle section. Also in the overshoot section (between $\theta_5$ and $\theta_6$), there is a possibility that the gravity moment not so small acts on the joint axis of the joint such as, for example, the joint 112. However, by controlling the driving speed of the joint in, for example, the joint angles $\theta_4$ to $\theta_5$, it is possible to measure the lost motion under the certain measurement condition every time by securing the angle section of the certain overshoot section (between $\theta_5$ and $\theta_6$).

Figure 14:
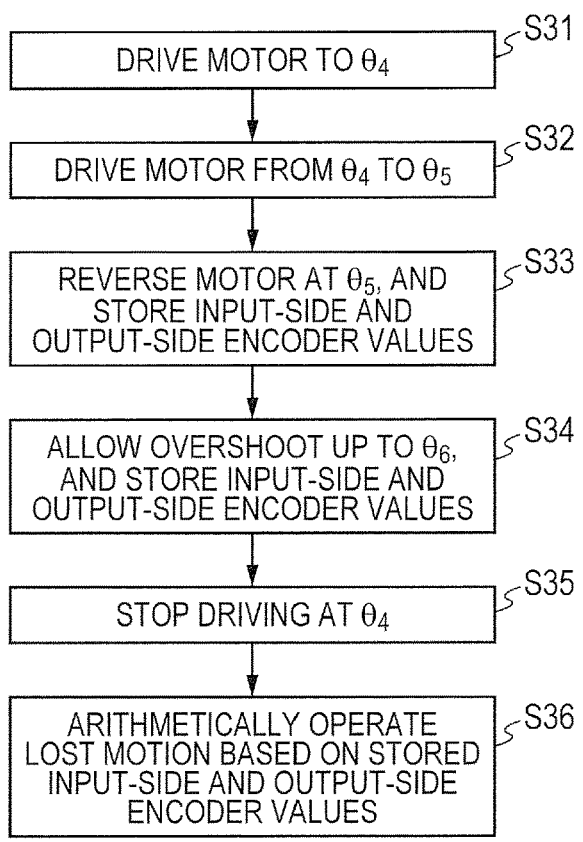
FIG. 14 is a flow chart for describing control according to the third embodiment.

FIG. 14 is the flow chart for describing the measurement control described with reference to FIG. 13. In S31 of FIG. 14, the CPU 201 drives the motor (servomotor 1) of the measurement-target joint 112 to rotate it to the joint angle $\theta_4$ which is the measurement start point.

In S32, the CPU drives the motor (servomotor 1) from the joint angle $\theta_4$ to the joint angle $\theta_5$. In S33, the CPU reverses the driving direction of the motor at the time when the joint angle reaches $\theta_5$. In S34, the CPU overshoots the joint up to the joint angle $\theta_6$. In the overshoot section (between $\theta_5$ and $\theta_6$), the CPU records (stores) the output values of the input-side encoder 10 and the output-side encoder 16 of the measurement-target joint 112. Subsequently, the CPU stops driving the measurement-target joint 112 at the joint angle $\theta_4$ (S35).

In S36, the CPU calculates the measurement value of the lost motion by the above arithmetic operating method, based on the output values of the input-side encoder 10 and the output-side encoder 16 of the measurement-target joint 112 recorded in the overshoot section (between $\theta_5$ and $\theta_6$). It is possible to use the measurement value of the lost motion obtained as above, for the lifetime diagnosis (S24 to S26 in FIG. 8) as well as the first embodiment.

As described above, according to the third embodiment, even in the condition that the gravity moment of the driven part acts on the measurement-target joint, the motor (servomotor 1) of the joint is driven and controlled such that the overshoot of the certain angular amount occurs in the direction opposite to that of the gravity moment. Further, the length of the overshoot section ($\theta_5 \rightarrow \theta_6$) is controlled to be larger than the angle of the lost motion. Then, in the certain-angle overshoot section ($\theta_5 \rightarrow \theta_6$) in the opposite direction of the gravity moment after the reverse driving of the motor, the lost motion of the measurement-target joint is measured based on the output values of the input-side encoder (10) and the output-side encoder (16) of the relevant joint. By performing the measurement control as described above, it is possible to measure the lost motion of the measurement-target joint without being influenced by the gravity moment generated by the driven part of the relevant joint. Thus, it is possible to diagnose the lifetime of the speed reducer by periodically performing the above measurement.

Incidentally, when the end effector at the end of the robot arm 101 is exchanged, the geometric constitution of the arm changes. Thus, when the gravity condition (mass and/or gravity center position) related to the specific joint changes due to the change of the geometric constitution, it is necessary to change the control conditions of the above overshoot section (between $\theta_5$ and $\theta_6$) and the like.

Fourth Embodiment

The lost motion measurement control applicable to the joint (for example, the joint 111) for which the gravity moment does not influence has been described in the first embodiment, and the lost motion measurement control applicable to the joint (for example, the joint 112) for which the gravity moment possibly influences has been described in the second and third embodiments. Generally, the robot arm (101) mixedly comprises the joint for which the gravity moment of the driven part thereof does not influence and the joint for which the relevant gravity moment influences, in accordance with the constitution or the orientation of the arm.

Therefore, in the fourth embodiment, an example that any one of the measurement controls respectively described in the first, second and third embodiments is selected according to whether or not the measurement-target joint is influenced by the gravity moment of the driven part thereof will be described. Incidentally, it is assumed that the hardware and the control system configuration in the present embodiment are the same as those described in the above embodiments.

Figure 15:
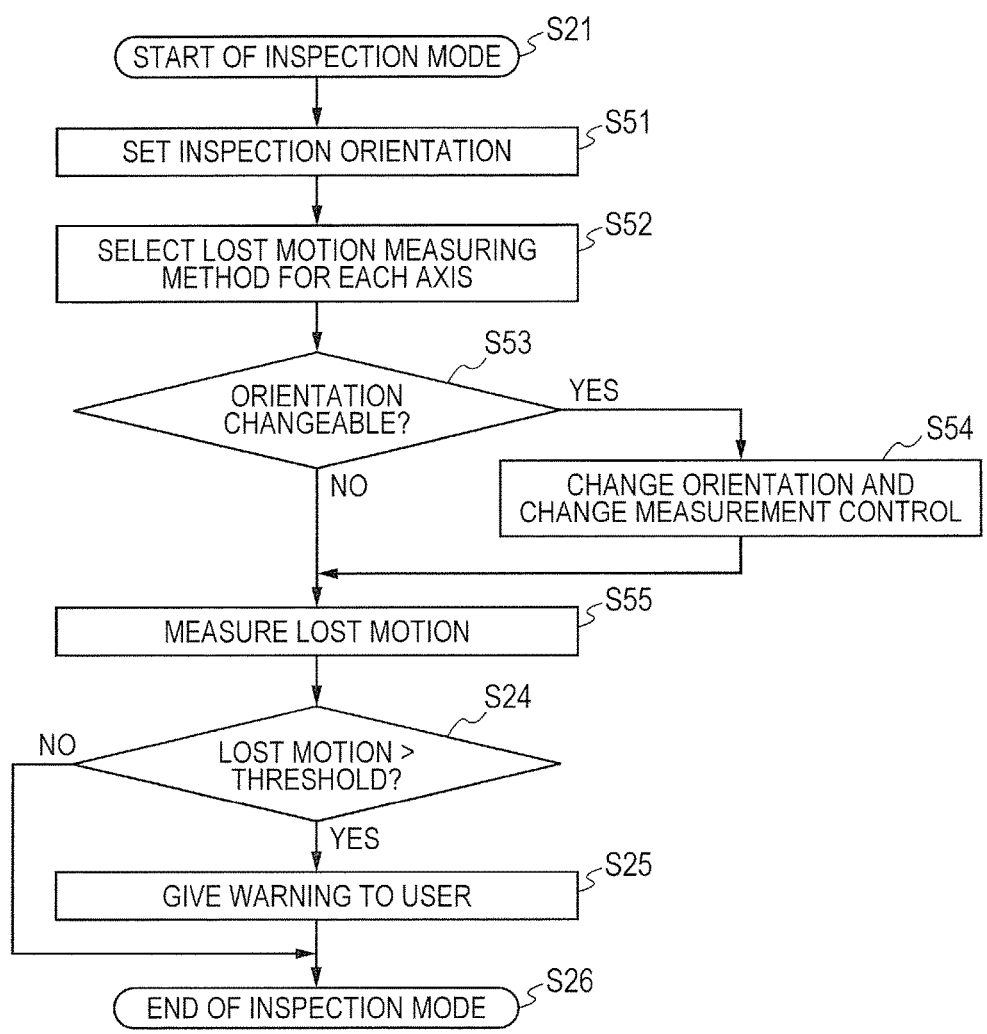
FIG. 15 is a flow chart for describing lost motion measurement control according to the fourth embodiment.

FIG. 15 is a flow chart for describing a measurement control procedure according to the fourth embodiment. In FIG. 15, the process steps same as or corresponding to those in the flow chart of FIG. 8 are denoted by the same numerals respectively, and the detailed descriptions thereof are omitted here.

In S51 of FIG. 15, the joints 111 to 116 are positioned at the respective angles, and the robot arm 101 is controlled to have a predetermined measurement orientation (inspection orientation). Then, it is calculated (decided) whether or not the gravity moment is generated for each of the joints 111 to 116. At this time, it is possible, according to a design condition, to perform such decision for the joint such as the joint 111 for which it is possible to constitutionally specify whether or not the gravity moment is generated. Besides, it is possible to perform such decision for another joint based on the orientation of the driven part of the relevant joint in the measurement orientation of the robot arm 101.

In S52, the measurement control according to the first embodiment is selected for the joint for which the gravity moment is not generated. Moreover, in S52, on the premise that the gravity moment is generated, the measurement control according to the second embodiment is selected when the joint has the orientation by which the gravity moment MgL2 is smaller than the frictional torque Tf, whereas the measurement control according to the third embodiment is selected when the joint has the orientation by which the gravity moment MgL2 is not smaller than the frictional torque Tf. For example, it is possible to decide the magnitude relation between the frictional torque Tf and the gravity moment MgL2 by the method described in the second embodiment. That is, the measurement-target joint is positioned with the arbitrary orientation (rotation angle), the driving of the motor for driving the relevant joint is interrupted, the output values of the input-side encoder 10 and the output-side encoder 16 are monitored before and after the interruption, and the magnitude relation is decided based on the monitored result.

In the case where the method according to the second embodiment is selected in S52, when it is decided in S53 that the measurement control according to the first embodiment can be performed by changing the orientation, the process is advanced to S54. In S54, the orientation of the robot arm 101 is changed to the orientation by which the measurement control according to the first embodiment can be performed, and the measurement control according to the first embodiment is selected anew.

The above procedure is also applicable to the case where the method according to the third embodiment is selected in S52. Namely, when it is decided in S53 that the measurement control according to the first embodiment can be performed by changing the orientation, the process is advanced to S54. In S54, the orientation of the robot arm 101 is similarly changed to the orientation by which the measurement control according to the first embodiment can be performed, and the measurement control according to the first embodiment is selected anew.

On the other hand, in the case where the measurement control according to the third embodiment is selected in S52, the orientation cannot be changed to the orientation by which the measurement control according to the first embodiment can be performed. However, even in this case, when the measurement control according to the second embodiment can be performed, the orientation is changed to the orientation by which the measurement control according to the second embodiment can be performed, and the measurement control according to the second embodiment is selected anew in S54.

Since it is necessary to make the overshoot larger than the lost motion when performing the control in the third embodiment, there is a case where it takes a time for operation adjustment. In consideration of this case, the controlling in S53 and S54 is performed in the manner as described above. In any case, as described above, by performing the processes in S53 and S54, it is possible to swiftly perform the lost motion measurement by selecting not the measurement control in the third embodiment but the measurement control in the first or second embodiment as much as possible (S55).

Moreover, since the variation of the gravity moment by the joint rotation angle in the measurement control in the first embodiment is smaller than that in the second embodiment, if it is possible to select any measurement control in S53 and S54, then it may be possible to select the measurement control in the first embodiment. That is, when the plurality of lost motions can be selected by the orientation change, it may be controlled to select firstly the measurement control in the first embodiment, secondly the measurement control in the second embodiment and thirdly the measurement control in the third embodiment in this priority order.

By performing the control described as above, it is possible according to the fourth embodiment to calculate existence/non-existence of the gravity moment for each joint of the robot arm 101 and select the optimum measurement control for the relevant joint by the measurement control based on the different lost motion. Accordingly, according to the fourth embodiment, it is possible to achieve the high-reliability lost motion measurement, and it is thus possible to achieve the high-reliability lifetime diagnosis.

Incidentally, in the measurement control according to the first embodiment, the gravity moment due to the driven part is not generated, and the preliminary operation of one-sided positioning the lost motions is performed. In the measurement control according to the second embodiment, it is unnecessary to perform the preliminary operation of one-sided positioning the lost motions because the gravity moment can be cancelled by friction. In the measurement control according to the third embodiment, it is unnecessary to perform the preliminary operation of one-sided positioning the lost motions because the overshoot section in which the influence of the gravity moment can be ignored practically is used.

Fifth Embodiment

It is possible to perform the lost motion measurement and the lifetime diagnosis based thereon described in each of the first to fourth embodiments in, for example, the initializing operation to be performed at the time when the power supply of the system is turned on. Besides, it may be possible to periodically perform the lost motion measurement and the lifetime diagnosis based thereon, on the basis of a timer clocking operation or the like. Such operations correspond to the methods which are performed in an inspection mode or a test mode to be performed independently of the actual operation duration of the robot apparatus in the workpiece production site of, for example, industrial products or the like.

However, as described in the fifth embodiment, it is possible to perform the lost motion measurement and the lifetime diagnosis based thereon by using the robot operation in not the inspection mode or the test mode but the actual operation duration of the robot apparatus In the fifth embodiment, the lost motion measurement and the lifetime diagnosis based thereon are performed not in the inspection mode but in the actual operation duration of the robot apparatus installed in the workpiece production site. More specifically, they are performed in a workpiece production process.

That is, in the fifth embodiment, a joint driving period in which it is possible to perform the angle obtaining step for the measurement-target joint in the actual process of operating the robot apparatus based on a predetermined robot program for the purpose of workpiece production or the like is previously specified. Then, when in fact performing the actual process, the output values of the input-side encoder 10 and the output-side encoder 16 are obtained in the previously specified joint driving period, and the lost motion is measured.

Figure 16:
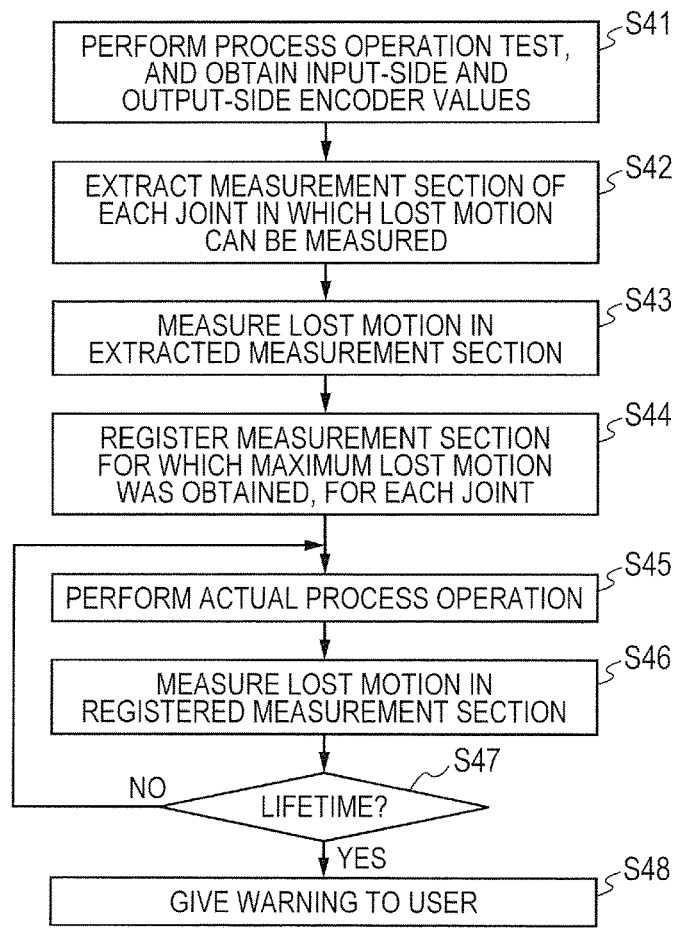
FIG. 16 is a flow chart for describing lost motion measurement control according to the fifth embodiment.

FIG. 16 is a flow chart for schematically describing a measurement control procedure to be performed by the CPU 201 of a robot apparatus 500C installed in the workpiece production site, according to the fifth embodiment. In this case, it is assumed that the operation procedures of works (parts), tools and the like of the robot arm 101 for producing workpieces have previously been prepared as the robot program. Moreover, it is assumed that the hardware of the robot apparatus 500C and the control system configuration in the fifth embodiment are the same as those described in the above embodiments.

In S41 of FIG. 16, the CPU causes the robot arm 101 to perform the operation same as that of the actual process, based on the previously prepared robot program. During the above operation, the CPU obtains the output values of the input-side encoder 10 and the output-side encoder 16 of each joint.

In S42, the CPU 201 extracts (selects), from the robot program, the measurement section in which the measurement control described in the first to third embodiments can be performed, by using, for example, the output-side encoder value obtained in S41. In this case, the CPU selects or decides whether or not to perform any measurement control in the first to third embodiments, for each of the extracted measurement section, performs an association operation, and then stores the obtained results in the control memory region provided in the RAM 203 or the like.

In the present embodiment, the above "measurement section" is described or expressed by control time (of which the accuracy corresponds to, for example, "μs" order) which can be identified by timer clocking using, for example, an RTC (real-time clock) element.

In S43, the CPU measures the lost motion by any of the measurement control in the first to third embodiments, by using the output values of the input-side encoder 10 and the output-side encoder 16 of each joint in the measurement section extracted in S42.

In S44, the CPU registers the measurement section, for which the maximum lost motion measured in S43 for each joint was obtained, in the control memory region provided in the RAM 203 or the like. At this time, it may be possible to associate the (maximum) lost motion value obtained in the relevant measurement section with the control memory region, and then register the associated values.

Next, in S45, the CPU causes the robot arm 101 to perform the operation of the actual process according to the robot program. During the above operation, in S46, the CPU measures, for each joint, the lost motion thereof in the measurement section registered in S44.

In S47, the CPU decides whether or not the lost motion measured in S46 is within a reference value to diagnose the lifetime. That is, the lost motion measured in S46 and a predetermined threshold are compared with each other, and the lifetime of the joint, particularly the speed reducer thereof, is diagnosed based on a result of the comparison. As the reference value to be used in such diagnosis, it may be possible to use, instead of the threshold previously prepared in the ROM 202 or the RAM 203, the (maximum) lost motion value obtained in the relevant measurement section registered in S44. When it is not decided in S47 that the lifetime of the relevant joint has come, the process is returned to S45 to continue the operation of the actual process. On the other hand, when it is decided in S47 that the lifetime of the relevant joint has come, the process is advanced to S48 to give a warning, indicating that the lifetime of the relevant joint has come, to the user. In S48, it may be possible to previously determine whether or not to perform emergency stop control for stopping the operation of the actual process, in accordance with an operation rule or the like.

As described above, according to the fifth embodiment, it is possible, by performing the operation of the actual process in the test mode (S41 to S44), to select and register the measurement section in which it is possible to perform the lost motion measurement (for example, by the measuring method in any of the first to third embodiments). After then, in the subsequent operation of the actual process, the lost motion measurement is performed according to the output values of the input-side encoder 10 and the output-side encoder 16 in the selected and registered measurement section, and the lifetime diagnosis is performed according to a result of the measurement. Therefore, according to the fifth embodiment, it is possible to perform the lost motion measurement and the lifetime diagnosis in actual time by using the operation of the actual process. For this reason, since the inspection mode and the test mode which do not directly contribute the actual workpiece manufacture are unnecessary, it is possible to highly improve workpiece manufacture efficiency.

Sixth Embodiment

In the above first to fifth embodiments, the lost motion is measured based on the output values of the input-side encoder (10) and the output-side encoder (16) of the speed reducer (11) in the driving system of the measurement-target joint, and the lifetime decision (lifetime diagnosis) is performed based on the measured lost motion. Besides, in each of the above embodiments, the example that the lifetime diagnosis is performed by comparing the measured lost motion with, for example, the value (threshold) corresponding to the limit value of the allowable range has been described.

According to the lifetime diagnosing method as described above, when the lifetime of the measurement-target joint (particularly, the speed reducer serving as the driving system thereof) has come, it is possible to find (detect) such a fact. However, in the actual workpiece production site of industrial products or the like, there is a case where an obstacle such as defective assembling or the like occurs by the actual lifetime of the joint of the robot arm. In this case, when the production process is stopped due to the actually occurred obstacle, there is a fear that the production cannot continuously be performed until the target robot arm is exchanged. Such a situation causes costly damage to the user. Therefore, the situation like this should be avoided if possible.

Accordingly, in the sixth embodiment, a constitution of predicting a life expectancy of the robot apparatus, particularly (the speed reducer of) the joint thereof, based on the past measured lost motion, and notifying the user (administrator) of a result of the prediction will exemplarily described hereinafter. If the prediction result of the life expectancy of the joint (the speed reducer thereof) can be obtained, the user (administrator) can take preventive measures (predictive maintenance or preventive maintenance) such as exchange of the joint part (or the whole of the robot arm) and the like by the lifetime of the joint of the robot arm. Also, in the sixth embodiment, it is assumed that the hardware of the robot apparatus and the control system configuration are the same as those described in the above embodiments.

Figure 17:
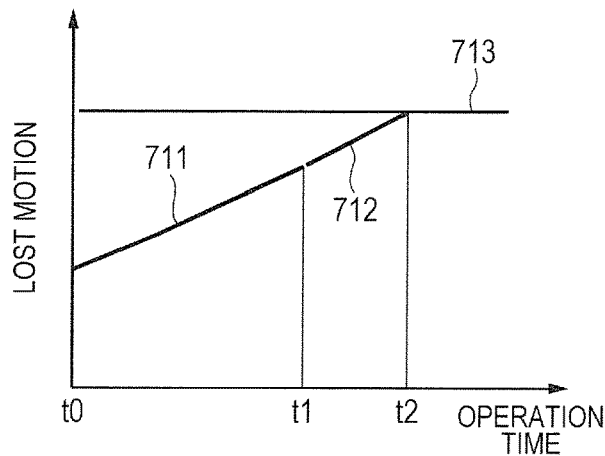
FIG. 17 is a diagram for describing a relation between operation time of the robot arm and a lost motion according to the sixth embodiment.

FIG. 17 is a diagram for schematically describing a lifetime (life expectancy) prediction control procedure to be performed by the CPU 201 of the robot apparatus (e.g., 500C) installed in the workpiece production site, according to the sixth embodiment.

In FIG. 17, the horizontal axis corresponds to operation time, and the vertical axis corresponds to the lost motion measurement value obtained under the measurement control of, for example, the first to third embodiments. That is, FIG. 17 is the diagram for describing the relation between the operation time of the robot arm (101) and the lost motion. Usually, in proportion as the operation time increases, the lost motion increases. Incidentally, the change of the lost motion of one joint is shown in FIG. 17. Therefore, in the robot arm (101) having the six (joint) shafts as shown in FIG. 1, the six kinds of similar graphs can be obtained by measuring the lost motions for the respective joints.

It is possible for the CPU 201 to associate the lost motion measurement value for each joint with the measurement time and store them in the recording area of the RAM 203, the HDD 204 or another non-volatile memory. In this case, it is possible as a data format to use file formats of various data base systems.

In FIG. 17, a wave shape 711 (substantially indicated as a straight line for simplification) from an origin (t0) to a time t1 corresponds to the lost motion value actually measured for the relevant joint. In this case, by referring to the lost motion value in the recording area provided in the RAM 203, the HDD 204 or the like, it is possible for the CPU 201 to predict a wave shape 712 of the lost motion value after the time t1, by an interpolation calculation such as linear approximation, polynomial approximation or the like.

A threshold 713 is a predetermined limit value for the relevant joint, as well as the above embodiments. It can be understood that the wave shape 712 predicted in FIG. 17 crosses the threshold 713 at a time t2. The period between the times t1 and t2 corresponds to (the time length of) the life expectancy of the relevant joint.

That is, if the wave shape 711 of the lost motion measurement value is stored and accumulated by the time t1, it is possible for the CPU 201 to predict that the lost motion measurement value reaches the threshold 713 being the limit at the time t2, that is, the lifetime of the relevant joint comes at the time t2.

It is possible for the CPU 201 to perform such life expectancy prediction at the timing of the lifetime decision (diagnosis) after the lost motion measurement as in S24 of FIG. 8 and S46 of FIG. 16. That is, at the timing of S24 of FIG. 8 and S46 of FIG. 16 (corresponding to the time t1), the CPU can refer to the lost motion value of the recording area provided in the RAM 203, the HDD 204 or the like, predict the wave shape 712 of the lost motion value after the time t1, obtain the time t2 (or the time length up to the time t2), and then notify the user (administrator) of the obtained result.

It is possible to perform such a life expectancy notification at the timing corresponding to S25 of FIG. 8 and S47 of FIG. 16. In this case, it is possible to use the display of the teaching pendant 300 or a separately arranged not-illustrated display to output the message notifying the predicted time t2 (or the time length up to the time t2). Besides, it may be possible to use not-illustrated voice synthesizing and voice outputting means for the notification.

Of course, the degree of progress of consumption of the joint changes if the process (robot program) executed by the robot arm (101) is changed. Namely, the period in which the lost motion corresponding to the wave shape 711 of FIG. 17 is stored and accumulated is necessarily the period in which it causes the robot arm (101) to perform the same process (robot program).

For this reason, when the process (robot program) to be performed by the robot arm (101) is changed, it only has to estimate the prediction value by using the stored or accumulated data of the lost motion measurement value from the time at which the process was changed. As a simple controlling method to do so, it only has to store the process change time (e.g., tc) when the process is changed, and perform wave shape prediction by using the wave shape of the lost motion measurement value from the process change time (tc) to the time t1. When the process is changed, since the old lost motion measurement values before the change are unnecessary, it may be possible to delete the stored or accumulated data of the lost motion measurement values from the recording area provided in the RAM 203 or the HDD 204 (or another non-volatile memory).

As described above, according to the sixth embodiment, it is possible to predict the life expectancy of the joint (the speed reducer thereof) and notify the user (administrator) of the prediction result. Thus, the user (administrator) can take preventive measures such as the exchange of the joint part (or the whole of the robot arm) and the like. Since the preventive measures such as the exchange of the joint part (or the whole of the robot arm) and the like can be performed at maintenance timing such as a periodic inspection or the like, it becomes unnecessary to unexpectedly or suddenly stop the production line and then perform repair or mending. For this reason, it is possible to more efficiently produce the workpieces by using the robot arm without deteriorating operation efficiency of the workpiece production line.

Although the embodiments of the present invention have been described as above, the present invention is not limited to these embodiments. Moreover, the effects described in the above respective embodiments are merely the most suitable effects derived from the present invention. Namely, the effect of the present invention is not limited to those described in the above embodiments.

For example, although the vertical multi-joint robot arm has been exemplarily described for the purpose of explanation in each of the above embodiments, the lost motion measurement technique for the joint of the robot apparatus according to the present invention is also applicable to a horizontal robot arm (scalar robot) and the like.

Each function of the measurement control and the robot control in each of the above embodiments is achieved by, for example, the CPU 201 serving as the main controlling unit of the controlling apparatus 200. Therefore, the above function can be achieved on condition that, for example, a recording medium which records (stores) the control program therein is supplied to the controlling apparatus 200 and the computer (CPU or MPU) of the controlling apparatus 200 reads out and executes the program stored in the recording medium. In this case, the program itself read out of the recording medium achieves the functions of the above embodiments, and the program itself and the computer-readable recording medium in which the program has been recorded (stored) constitute the present invention resultingly.

Although the HDD 204 has been used as the example of the computer-readable recording medium in each of the above embodiments, the control program recording medium according to the present invention is not limited to the HDD 204. Namely, the control program according to the present invention may be recorded or stored in any recording medium if it is a computer-readable recording medium. For example, as the recording medium to be used to supply the program, it may be possible to use the ROM 202, the external storing device 312 or the recording disk 331 illustrated in FIG. 3. Besides, as the recording medium, it is possible to use, for example, a flexible disk, a hard disk, an optical disk, a magneto-optical disk, a CD-ROM, a CD-R, a magnetic tape, a non-volatile memory card (flash memory), an ROM or the like. Moreover, it may be possible to download the control program according to the present invention via a network and then cause a computer to execute the downloaded program.

The present invention is not limited to the case where the functions of the above embodiments are achieved on condition that the computer executes the read program codes. For example, the present invention also includes a case where an OS (operating system) running on the computer performs a part of whole of the actual processes based on the instructions of the program codes according to the present invention, and thus the above functions are achieved by the relevant processes.

Further, the program codes read out of the recording medium may be written into a function expansion board inserted in the computer or a memory in a function expansion unit connected to the computer. The present invention also includes a case where a CPU or the like provided in the function expansion board or the function expansion unit performs a part or all of the actual processes based on the instructions of the program codes, and thus the functions of the above embodiments are achieved by the relevant processes.

The present invention can be achieved also in a case where a program for achieving one of more functions of the above embodiments is supplied to a system or an apparatus via a network or a storage medium and one or more processors in the system or the apparatus reads and executes the program. Further, the present invention can be achieved by a circuit (for example, ASIC) which achieves one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-140622, filed Jul. 14, 2015, which is hereby incorporated by reference herein in its entirety.

What is claimed is:

1. A robot apparatus which drives a joint by a controlling apparatus, wherein:
   the joint comprises:
      a rotation driving source,
      a transmission configured to change driving of the rotation driving source,
      a first angle sensor configured to detect a rotation angle of a rotation shaft of the rotation driving source, and
      a second angle sensor configured to detect a rotation angle of an output shaft of the transmission; and
   the controlling apparatus is configured to obtain output values of the first and second angle sensors by driving the rotation driving source and driving the joint via the transmission in an orientation of the robot apparatus by which a gravity moment acting on the joint is smaller than driving resistance of the joint, and to calculate an angular difference between a predetermined angle and the rotation angle of the output shaft of the transmission based on the obtained output values of the first and second angle sensors.

2. The robot apparatus according to claim 1, wherein the controlling apparatus is further configured to, before driving the rotation driving source and driving the joint via the transmission in the orientation of the robot apparatus by which the gravity moment acting on the joint is smaller than the driving resistance of the joint, drive the joint in a direction opposite to a driving direction of the joint and move gears of the transmission to one side.

3. The robot apparatus according to claim 1, wherein the controlling apparatus is further configured to, when driving the rotation driving source and driving the joint via the transmission in the orientation of the robot apparatus by which the gravity moment acting on the joint is smaller than the driving resistance of the joint, drive the joint by a rotation angle larger than a past-calculated angular difference of the transmission.

4. The robot apparatus according to claim 1, wherein the predetermined angle is an ideal value of the rotation angle of the output shaft of the transmission, which is calculated based on the output value of the first angle sensor and a transmission ratio of the transmission.

5. The robot apparatus according to claim 1, wherein the controlling apparatus is further configured to stop the joint at an arbitrary position, and, when the output values of the first and second angle sensors do not change before and after the stop, to decide the orientation at the joint stop position as the orientation of the robot apparatus by which the gravity moment acting on the joins is smaller than the driving resistance of the joint.

6. The robot apparatus according to claim 5, wherein the controlling apparatus is further configured to control the orientation by controlling the robot apparatus such that the gravity moment acting on the joint becomes approximately constant.

7. The robot apparatus according to claim 5, wherein the controlling apparatus is further configured to control the orientation by controlling the robot apparatus such that a gravity center of the robot apparatus to be driven approximately coincides with a vertical axis passing through a joint axis of the joint.

8. The robot apparatus according to claim 7, wherein
the controlling apparatus is further configured to detect, by using a gravity sensor arranged on a base of the robot apparatus, an orientation of the base to a vertical axis, and
the controlling apparatus is further configured to control a position of a link such that the gravity center of the link approximately coincides with the vertical axis passing through the joint axis of the joint, based on the detected orientation of the base to the vertical axis.

9. The robot apparatus according to claim 1, wherein
the controlling apparatus is further configured to control a driving direction of the rotation driving source so as to generate an overshoot section in which, by mass of a link driven by the joint, the joint operates by a certain angle in an opposite direction of the gravity moment acting on the joint, and
the controlling apparatus is further configured to obtain the output values of the first and second angle sensors in the overshoot section.

10. The robot apparatus according to claim 1, wherein the controlling apparatus is further configured to detect a state of the transmission from the calculated angular difference and to notify a user of the detected state.

11. The robot apparatus according to claim 1, wherein
the robot apparatus is configured to have an inspection mode, and
the controlling apparatus is configured to operate in the inspection mode.

12. The robot apparatus according to claim 1, wherein the controlling apparatus is configured to operate the robot apparatus based on a robot program in which a joint driving period has been set previously, and obtain the output values of the first and second angle sensors in the joint driving period.

13. The robot apparatus according to claim 1, wherein the controlling apparatus is further configured to calculate the magnitude of the angular difference from the obtained output values, compare the angular difference with a predetermined threshold, and diagnose a lifetime of the transmission based on a result of the comparison.

14. The robot apparatus according to claim 1, wherein
the controlling apparatus is further configured to calculate the magnitude of the angular difference of the transmission from the obtained output values,
the controlling apparatus further comprises a storing unit configured to store the angular difference, and
the controlling apparatus is further configured to predict a life expectancy of the robot apparatus based on the angular difference stored in the storing unit.

15. A controlling method of a robot apparatus which comprises a joint having a rotation driving source, a transmission configured to change driving of the rotation driving source, a first angle sensor configured to detect a rotation angle of a rotation shaft of the rotation driving source, and a second angle sensor configured to detect a rotation angle of an output shaft of the transmission, the controlling method comprising:
obtaining, by a controlling apparatus, output values of the first and second angle sensors by driving the rotation driving source and driving the joint via the transmission in an orientation of the robot apparatus by which a gravity moment acting on the joint is smaller than driving resistance of the joint; and
calculating, by the controlling apparatus, an angular difference between a predetermined angle and the rotation angle of the output shaft of the transmission based on the obtained output values of the first and second angle sensors.

16. A non-transitory computer-readable storage medium which stores a control program for performing a controlling method of a robot apparatus which comprises a joint having a rotation driving source, a transmission configured to change driving of the rotation driving source, a first angle sensor configured to detect a rotation angle of a rotation shaft of the rotation driving source, and a second angle sensor configured to detect a rotation angle of an output shaft of the transmission, the controlling program comprising:
code for obtaining, by a controlling apparatus, output values of the first and second angle sensors by driving the rotation driving source and driving the joint via the transmission in an orientation of the robot apparatus by which a gravity moment acting on the joint is smaller than driving resistance of the joint; and
code for calculating, by the controlling apparatus, an angular difference between a predetermined angle and the rotation angle of the output shaft of the transmission based on the obtained output values of the first and second angle sensors.

17. A controlling apparatus which controls a robot apparatus which comprises a joint having a rotation driving source, a transmission configured to change driving of the rotation driving source, a first angle sensor configured to detect a rotation angle of a rotation shaft of the rotation driving source, and a second angle sensor configured to detect a rotation angle of an output shaft of the transmission, wherein
the controlling apparatus is configured to obtain output values of the first and second angle sensors by driving the rotation driving source and driving the joint via the transmission in an orientation of the robot apparatus by which a gravity moment acting on the joint is smaller than driving resistance of the joint, and
the controlling apparatus is configured to calculate an angular difference between a predetermined angle and the rotation angle of the output shaft of the transmission based on the obtained output values of the first and second angle sensors.

* * * * *